United States Patent
Yamamura et al.

(10) Patent No.: US 8,021,232 B2
(45) Date of Patent: Sep. 20, 2011

(54) VIDEO GAME METHOD AND APPARATUS FOR STATE-BASED SCROLLING

(75) Inventors: Yasuhisa Yamamura, Kyoto (JP); Shigeyuki Asuke, Kyoto (JP); Toshinori Kawai, Kyoto (JP)

(73) Assignee: Nintendo Co., Ltd., kyoto (JP)

( * ) Notice: Subject to any disclaimer, the term of this patent is extended or adjusted under 35 U.S.C. 154(b) by 1190 days.

(21) Appl. No.: 10/837,691

(22) Filed: May 4, 2004

(65) Prior Publication Data

US 2004/0224757 A1   Nov. 11, 2004

(30) Foreign Application Priority Data

May 7, 2003   (JP) ................................. 2003-128572

(51) Int. Cl.
*A63F 13/00* (2006.01)
(52) U.S. Cl. ............................................. 463/30; 37/33
(58) Field of Classification Search ................ 463/1, 30, 463/31, 34, 43, 37, 33
See application file for complete search history.

(56) References Cited

U.S. PATENT DOCUMENTS

| | | | |
|---|---|---|---|
| 6,175,366 B1 * | 1/2001 | Watanabe et al. | 345/422 |
| 6,296,570 B1 * | 10/2001 | Miyamoto et al. | 463/30 |
| 6,375,572 B1 * | 4/2002 | Masuyama et al. | 463/43 |
| 6,949,024 B2 * | 9/2005 | Kaku et al. | 463/31 |
| 2001/0006908 A1 * | 7/2001 | Fujioka et al. | 463/3 |
| 2001/0046896 A1 * | 11/2001 | Miyamoto et al. | 463/31 |
| 2002/0082080 A1 * | 6/2002 | Kojima | 463/31 |
| 2002/0137557 A1 * | 9/2002 | Ishii et al. | 463/8 |

OTHER PUBLICATIONS

"Super Family Computer Perfect Work-through Series 35 Super Mario Collection." Hissyo Koryaku Hou, 2$^{nd}$ ed., Futabasha Co., Ltd., pp. 95-95 (Jan. 20, 1999).
"Elemental Gimic Gear Official Complete Guide," 1$^{st}$ ed., SoftBank Publishing Co. Ltd., p. 129 (Jun. 7, 1999).

* cited by examiner

*Primary Examiner* — Dmitry Suhol
*Assistant Examiner* — Malina K Rustemeyer
(74) *Attorney, Agent, or Firm* — Nixon & Vanderhye P.C.

(57) ABSTRACT

A game apparatus CPU turns on a scroll operating flag when it detects that a player object exists at a predetermined position, that is, within a scroll operating range while performing a predetermined action on a contact object. If the scroll operating flag is turned on, first scrolling is performed, and a screen display position is gradually moved so as to be close to a scroll target value. If the operating flag is not turned on, normal adjustment of a screen display position is performed as necessary. After disappearance of the contact object, the first scrolling is not performed, therefore preventing unnatural scroll display (e.g., displaying an item that it is no longer possible to reach due to change of state).

18 Claims, 14 Drawing Sheets

(A)

(B)

VIDEO GAME METHOD AND APPARATUS FOR STATE-BASED SCROLLING

CROSS-REFERENCES TO RELATED APPLICATIONS

This application claims priority to JP Application No. 2003-128572, filed 7 May 2003. The entire contents of this application are incorporated herein by reference.

STATEMENT REGARDING FEDERALLY SPONSORED RESEARCH OR DEVELOPMENT

Not applicable.

FIELD

The technology herein relates to video games, and more particularly to a game apparatus and a storage medium storing a game program. More specifically, the technology herein relates to a game apparatus and a storage medium storing a game program that displays a background image larger than a display screen to be displayed on a display by scrolling.

BACKGROUND AND SUMMARY

In some conventional game systems, a display screen is scrolled according to position coordinates of a player object. When the player object moves in the game (e.g., is transported on a specific block, for example), by scrolling a display screen up, an item which has been out of a display range and previously hidden from view is displayed, so that the item is presented to and can be seen by the player.

However, in some prior games, there is a problem that since scrolling is performed on the basis of only the position coordinates of the player object, after a state of the background is changed due to disappearance of some objects such as a block (e.g., caused by its destruction), even if the player object simply moves once again to a position where the disappeared object was present by jumping, the display screen is nevertheless scrolled. Accordingly, an item, which has become impossible to be reached due to the change of the game state is nevertheless scroll-displayed each time. Such scroll display is unnatural for advancing the game. Furthermore, in a case that the player moves the player object without intending to scroll, when the player object moves to the above-described position, the screen is largely affected by scrolling, potentially causing low operability and drudgery instead of play with ease.

A non-limiting exemplary illustrative implementation provides a game apparatus and a storage medium storing a game program capable of scrolling according to a state of a game, and realizing a natural screen display that is easy for a player to play.

A game apparatus according to an exemplary implementation displays on a display a background image larger than a display screen to be displayed on the display by scrolling. The game apparatus comprises an operating means, a background image generating means, a player object generating means, a contact object generating means, a position detecting means, a predetermined action determining means, a scrolling means, and a displayed data generating means. The operating means is operated by a player. The background image generating means generates a background image. The player object generating means generates a player object moving on the basis of an operation input from the operating means. The contact object generating means generates a contact object to be contacted by the player object. The position detecting means detects a position of the player object. The predetermined action determining means determines whether or not the player object performs a predetermined action on the contact object. The scrolling means differentiates between a first scrolling when being determined that the predetermined action is performed by the predetermined action determining means and a second scrolling when being determined that the predetermined action is not performed by the predetermined action determining means in a case it is detected that the player object exists at a predetermined position by the position detecting means. The displayed data generating means generates displayed data for displaying on the display the display screen including the player object generated by the player object generating means and the background image generated by the background image generating means that exist within a display range scrolled by the scrolling means.

More specifically, in one exemplary illustrative implementation, a game apparatus displays on the display the background image larger than the display screen to be displayed on the display by scrolling. In the game apparatus, the operating means is operated by the player. A background image generator generates a background image. A player object generator generates a player object moving on the basis of the operation input from the operating means. A contact object generator generates a contact object to be contacted by the player object. A position detector detects the position of the player object. A predetermined action determiner (determines whether or not the player object performs the predetermined action on the contact object. A scroller differentiates between the first scrolling when being determined that the predetermined action is performed by the predetermined action determining means and the second scrolling when being determined that the predetermined action is not performed by the predetermined action determining means in a case that it is detected the player object exists at the predetermined position by the position detecting means. Then, the displayed data generator generates the displayed data to display on the display the display screen including the player object generated by the player object generating means and the background image generated by the background image generating means that exist within the display range scrolled by the scrolling means.

Accordingly, when the predetermined action is not performed on the contact object by the player object, the first scrolling is not performed, and a second scrolling such as a normal screen position adjustment that is performed in association with the movement of the player object. After the contact object disappears to change a state of the background, for example, even if the player object moves once again to the position for operating the first scrolling such as displaying the item. out of the display range before the change of the state, the first scrolling is never performed. This can eliminate useless and unnatural scroll display on an item which it becomes impossible to reach due to the change of the state, and can eliminate screen shake and tedious game play. Therefore, according to the non-limiting exemplary implementation, it is possible to scroll in correspondence to a state of the game. Furthermore, it is possible to provide appropriate and natural image representations according to the action of the player object, capable of displaying a screen that is easy for the player to play.

In one exemplary non-limiting implementation, the scrolling means differentiates between the first scrolling when being determined that the predetermined action is performed by the predetermined action determining means and the second scrolling when being determined that the predetermined action is not performed by the predetermined action determining means in a case that it is detected that the player object exists at a predetermined position in close to the contact object by the position detecting means. More specifically, when the player object exists at the predetermined position in close to the contact object, and performs the predetermined action on the contact object, the first scrolling is performed. That is, in this case, the player object directly performs the predetermined action on the contact object in close thereto, capable of performing a natural scrolling according to the action of the player object.

In another exemplary non-limiting implementation, the contact object generating means generates the contact object as a part of the background image. More specifically, when the player object performs a predetermined action on something displayed as a part of the background image, the first scrolling is performed. Accordingly, it is possible to perform a natural screen display according to the action of the player object. Furthermore, it is possible for the player to operate the first scrolling relatively easily.

In another exemplary non-limiting implementation, the contact object generating means generates a contact object as a moving object. More specifically, when the player object performs the predetermined action on something displayed as the moving object, the first scrolling is performed. Accordingly, it is possible to perform a natural screen display according to the action of the player object. Furthermore, the predetermined action with respect to the moving object can provide a relatively difficult operation. This makes the game challenging for the player, capable of improving interest in the game.

In a further exemplary non-limiting implementation, the scrolling means changes, in a case that it is detected that the player object exists at the predetermined position by the position detecting means, a scroll target in the first scrolling depending on an approach direction of the player object to the predetermined position. More specifically, the scrolling means (S45-S49) changes the scroll target in the first scrolling depending on the approach direction of the player object to the predetermined position. Accordingly, it is possible to perform varied screen displays according to the approach direction of the player object, capable of improving interest as a game.

In another exemplary non-limiting implementation, the contact object generating means generates the contact object of variable kinds. The scrolling means changes a scroll target in the first scrolling depending on a kind of the contact object when being determined that a predetermined action is performed by the predetermined action determining means. More specifically, the contact object of variable kinds is generated. Then, the scrolling means (S91, S93) changes the scroll target in the first scrolling depending upon the kind of the contact object when being determined that the predetermined action is performed by the predetermined action determining means. Accordingly, it is possible to perform varied screen displays depending on the kind of the contact object, capable of improving interest as a game.

In one aspect, a game apparatus further comprises a scroll control object generating means for generating a scroll control object arranged in association with the contact object and a scroll control information storing means for storing scroll control information in association with the scroll control object. In the game apparatus, the predetermined action determining means determines whether or not the player object performs the predetermined action on the contact object on which the scroll control object is arranged. The scrolling means controls the first scrolling on the basis of the scroll control information.

More specifically, the scroll control object generating means (40, 62c, S3) generates the scroll control object (114) arranged in association with the contact object. The scroll control information storing means (48, 52) stores the scroll control information (96, 98, 100) in association with the scroll control object. Then, the predetermined action determining means determines whether or not the player object performs the predetermined action on the contact object on which the scroll control object is arranged. The scrolling means controls the first scrolling on the basis of the scroll control information. Accordingly, the scroll control information is prepared in association with the scroll control object aside from the contact object, and the scroll control object is arranged with respect to the contact object only required for the scroll control, capable of decreasing a data volume.

The storage medium storing a game program according to this non-limiting implementation is a storage medium that stores a game program to be executed by a game apparatus which is provided with an operating means operated by a player, and displays on a display a background image larger than a display screen to be displayed on the display by scrolling. The game program makes the processor of the game apparatus executes the background image generating steps, the player object generating step, the contact object generating step, the position detecting step, the predetermined action determining step, the scrolling step, and the displayed data generating step. The background image generating step generates the background image. The player object generating step generates the player object moving on the basis of the operation input from the operating means. The contact object generating step generates the contact object to be contacted by the player object. The position detecting step detects the position of the player object. The predetermined action determining step determines whether or not the player object performs the predetermined action on the contact object. The scrolling step differentiates between the first scrolling when being determined that the predetermined action is performed by the predetermined action determining step and the second scrolling when being determined that the predetermined action is not performed by the predetermined action determining step in a case that it is detected the player object exists at the predetermined position by the position detecting step. The displayed data generating step generates the displayed data to display on the display the display screen including the player object generated by the player object generating step and the background image generated by the background image generating step that exist within the display range scrolled by the scrolling step.

In one exemplary non-limiting implementation, the scrolling step differentiates between the first scrolling when being determined that the predetermined action is performed by the predetermined action determining step and the second scrolling when being determined that the predetermined action is not performed by the predetermined action determining step in a case that it is detected that the player object exists at a predetermined position in close to the contact object by the position detecting step.

In another exemplary non-limiting implementation, the contact object generating step generates the contact object as a part of the background image.

In the other exemplary non-limiting implementation, the contact object generating step generates the contact object as a moving object.

In a further exemplary non-limiting implementation, the scrolling step changes, in a case that it is detected that the player object exists at the predetermined position by the position detecting step, a scroll target in the first scrolling depending on an approach direction of the player object to the predetermined position.

In still another exemplary non-limiting implementation, the contact object generating step generates the contact object of variable kinds. The scrolling step changes a scroll target in the first scrolling depending on a kind of the contact object when being determined that a predetermined action is performed by the predetermined action determining step.

In one aspect, a game apparatus further comprises a scroll control information storing means for storing scroll control information in association with the scroll control object. The game program further makes the processor of the game apparatus execute a scroll control object generating step for generating a scroll control object arranged in association with the contact object. In the game program, the predetermined action determining step determines whether or not the player object performs the predetermined action on the contact object on which the scroll control object is arranged. The scrolling step controls the first scrolling on the basis of the scroll control information.

In these storage mediums storing the game programs also, it is possible to scroll in correspondence to a state of the game as in the above-described game apparatus, capable of performing a natural screen display that is easy for the player to play.

According to an exemplary non-limiting implementation, the scrolling is controlled not only on the basis of the position of the player object but also on the basis of the presence of the predetermined action with respect to the contact object, capable of scrolling in correspondence with a state of the game. Accordingly, it is possible to realize a natural screen display that is easy for the player to play.

The above described objects and other objects, features, aspects and advantages of an exemplary non-limiting implementation will become more apparent from the following detailed description of an exemplary non-limiting implementation when taken in conjunction with the accompanying drawings.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
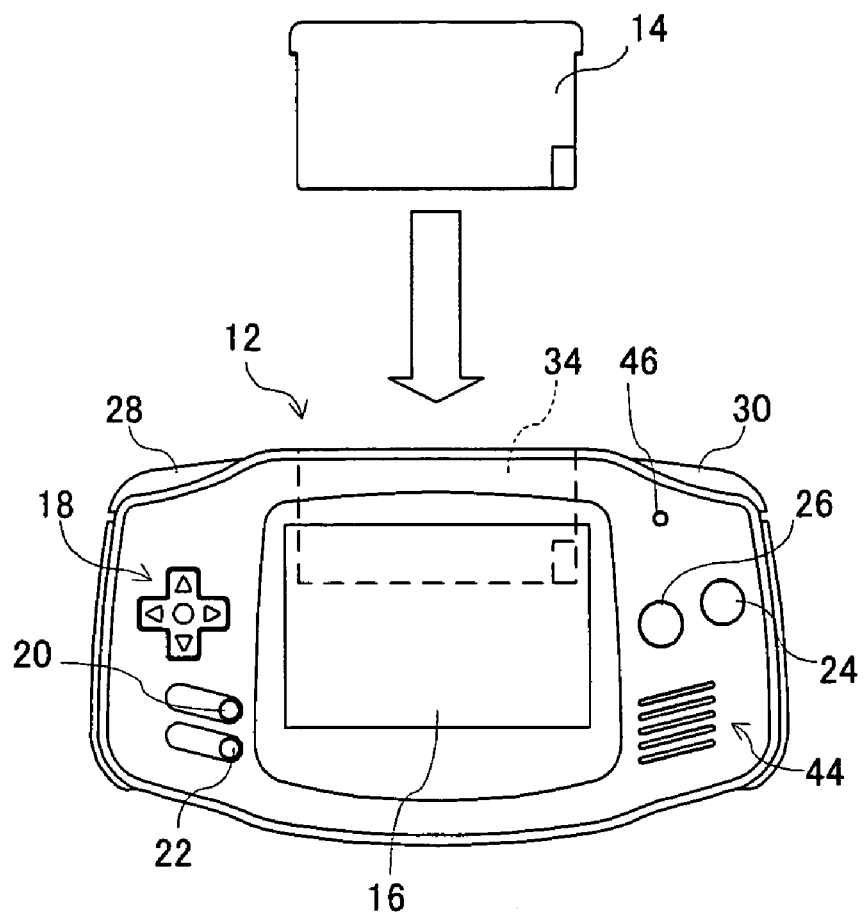
FIG. 1 is an exterior view showing a game apparatus of one implementation of an exemplary non-limiting implementation.

A game apparatus 10 exemplary non-limiting implementation shown in FIG. 1 includes a game machine 12 and a game cartridge 14 connected to the game machine 12. A portable game machine such as a GAMEBOY ADVANCE (GAMEBOY ADVANCE: product name) can be used as the game machine 12. The game apparatus 10 is not limited to the portable game machine 12. For example, a video game machine can be utilized and connected to a home-use television receiver. Furthermore, a game information storage medium is not limited to the cartridge 14. Various information storage medium such as an optical information storage medium including a CD-ROM, a DVD, a magnetooptical disk, a magnetic disk, or the like may be used.

A housing of the game machine 12 is provided with a color liquid crystal display (LCD) 16 as a display at a nearly center of a front surface thereof. On the LCD 16, a game image including a game world and game characters are displayed.

On the front surface of the housing, a cross button 18, a start button 20 and a select button 22 are provided at a predetermined position of the left of the LCD 16, and an A button 24 and a B button 26 are provided at a predetermined position of the right of the LCD 16. Furthermore, an L button 28 and an R button 30 are provided at left and right edge portions on an upper surface (ceiling surface) of the housing, respectively. The respective buttons are an operating means for allowing a user to play the game, and are collectively shown as an operating portion 32 in FIG. 2.

The cross button 18 functions as a direction switch and can move in a top-to-bottom or left-to-right direction a player character (player object), a cursor, and so on that are displayed on the LCD 16 by operating one of four depressing portions. The start button 20 is utilized for instructing starting a game. The select button 22 is utilized for selecting a game mode. The A button 24 is utilized for selecting (determining) an item designated by the cursor and the B button 26 is utilized for canceling the selected item. Each of the A button 24, the B button 26, the L button 28, and the R button 30 makes the player object displayed on the LCD 16 perform an arbitrary action set in advance for each operation such as throwing, catching, jumping, cutting by a sword, talking, and so forth by being operated singly or in combination thereof.

The housing is, at a depth side of the upper surface, provided with an inserting slot 34. Into this inserting slot 34, the game cartridge 14 is detachably inserted. Connectors 36 and 38 (FIG. 2) connectable with each other are respectively provided at a depth portion of the inserting slot 34 and at an opening of edge portion of the inserting direction of the game cartridge 14. Thus, when the connectors 36 and 38 are connected with each other, the cartridge 14 is rendered accessible by a CPU 40 (FIG. 2) of the game machine 12. Furthermore, at the near side of an upper surface of the housing, an external expansion connector (connector for communication) 42 (FIG. 2) is provided. The connector 42 is connected with a communication cable (not shown) at a time of performing an interactive play of the multi-player game, and so forth.

On the surface of the housing and below the A button 24 and the B button 26, a speaker 44 is provided for outputting a game sound such as BGM, a sound effect during the game. Furthermore, above the A button 24 and the B button 26, a power lamp 46 which lights up when a power is turned on, and changes in color depending on a remaining amount of a battery is provided.

In addition, although not illustrated, at the back surface of the housing, a battery accommodating box for setting a battery therein is provided. At the bottom surface of the housing, a power switch, a volume adjustment knob, and a headphones connecting terminal are provided.

Figure 2:
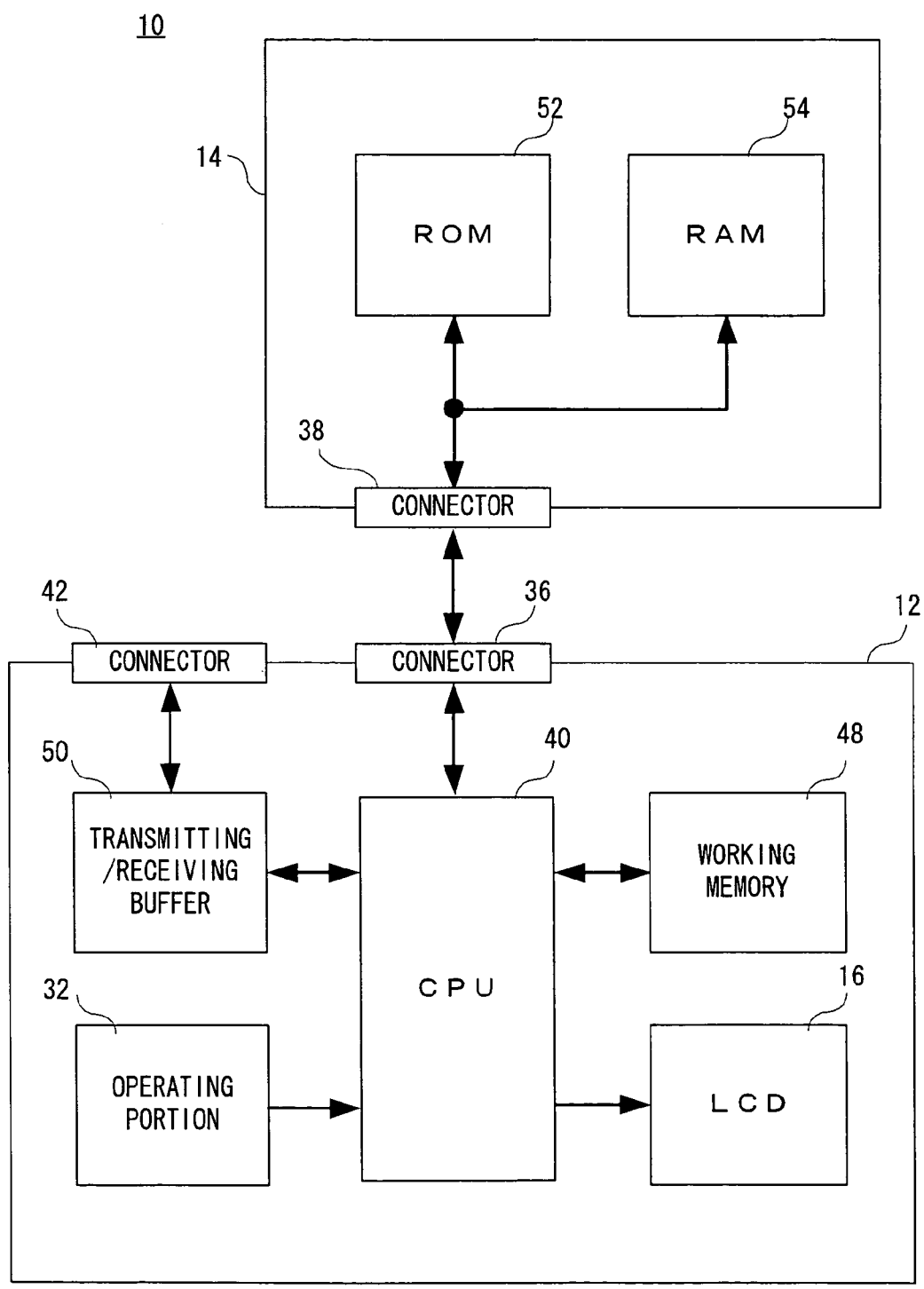
FIG. 2 is a block diagram showing one example of an internal configuration of the game apparatus of FIG. 1 implementation.

FIG. 2 is an electric configuration of the game apparatus 10 (game machine 12 and cartridge 14). Referring to FIG. 2, the game machine 12 includes the CPU 40, and the CPU 40 is called as a processor, a computer or the like, and responsible for entirely controlling the game machine 12. The CPU 40 is connected with the LCD 16, the operating portion 32, and the connector 36 described above via an internal bus, and is also connected with a working memory 48 and a transmitting/receiving buffer 50.

On the LCD 16, a game image is displayed in response to a display signal applied from the CPU 40. It is noted that although not illustrated, the CPU 40 is connected with a VRAM, and an LCD controller so as to render background image data, character image data, and game image data on the VRAM under an instruction of the CPU 40. Then, the LCD controller reads out the game image data (displayed data) rendered on the VRAM according to an instruction of the CPU 40, and displays the characters, a game screen (display screen) on the LCD 16. In this non-limiting implementation, the VRAM has a larger storing area than the screen to be displayed on the LCD 16.

The operating portion 32 includes the respective operating buttons 18, 20, 22, 24, 26, 28 and 30 described above, and an operation input signal in response to an operation of each of the operating buttons is applied to the CPU 40. Accordingly, the CPU 40 executes a process according to an instruction of the player (user) applied through the operating portion 32.

The working memory 48 is a writable/readable memory, and utilized as a work area or a buffer area of the CPU 40. The transmitting/receiving buffer 50 is for temporarily storing transmitting/receiving data at a time of performing the interactive play of the multi-player game, and connected to the external expansion connector 42. By connecting the connector 42 with another game machine 12 by use of the communication cable (not shown), data communications between a plurality of game machines 12 becomes possible.

Furthermore, although not illustrated, the CPU 40 is connected with the speaker 46 via a sound circuit, and in response to an application of a sound signal from the CPU to the sound circuit, a game sound such as a game music or a sound effect is output from the speaker 46.

The cartridge 14 includes a ROM 52 and a RAM 54 that are connected with each other via a bus and that are connected to the connector 38. Accordingly, as described above, when the cartridge 14 is inserted into the game machine 12, the connector 36 and the connector 38 are connected with each other, which electrically connects the CPU 40 with the ROM 52 and the RAM 54. Accordingly, the CPU 40 can read predetermined program data from a predetermined area of the ROM 52 so as to expand the same on the working memory 48, read out predetermined backup data from the RAM 54 so as to write the same to the working memory 48, or write and store to a predetermined area of the RAM 54 game data generated in correspondence with the proceeding of the game in the working memory 48.

It is noted that although the flash nonvolatile memory is coupled to the RAM 54, a ferroelectric memory (FeRAM), EEPROM, or the like may be used.

Figure 3:
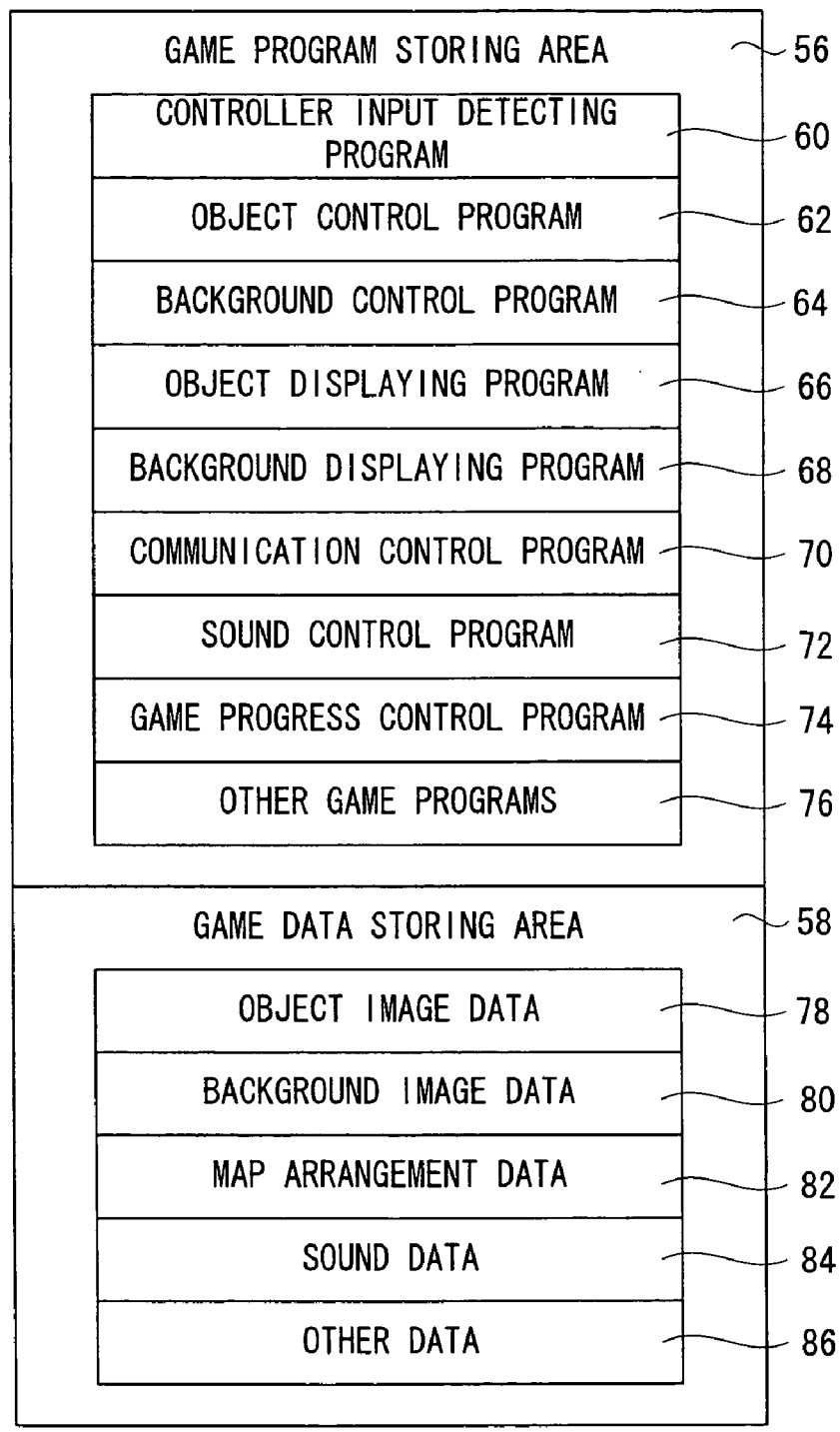
FIG. 3 is an illustrative view showing one example of a memory map of a ROM of a cartridge in FIG. 2.

The ROM 52 includes a game program storing area 56 and a game data storing area 58 as shown in FIG. 3. In the game program storing area 56, a controller input detecting program 60, an object control program 62, a background control program 64, an object displaying program 66, a background displaying program 68, a communication control program 70, a sound control program 72, a game progress control program 74, and other game programs 76, and so on are stored in advance. In the game data storing area 58, object image data 78, background image data 80, map arrangement data 82, sound data 84, other data 86, and so on are stored in advance.

Figure 4:
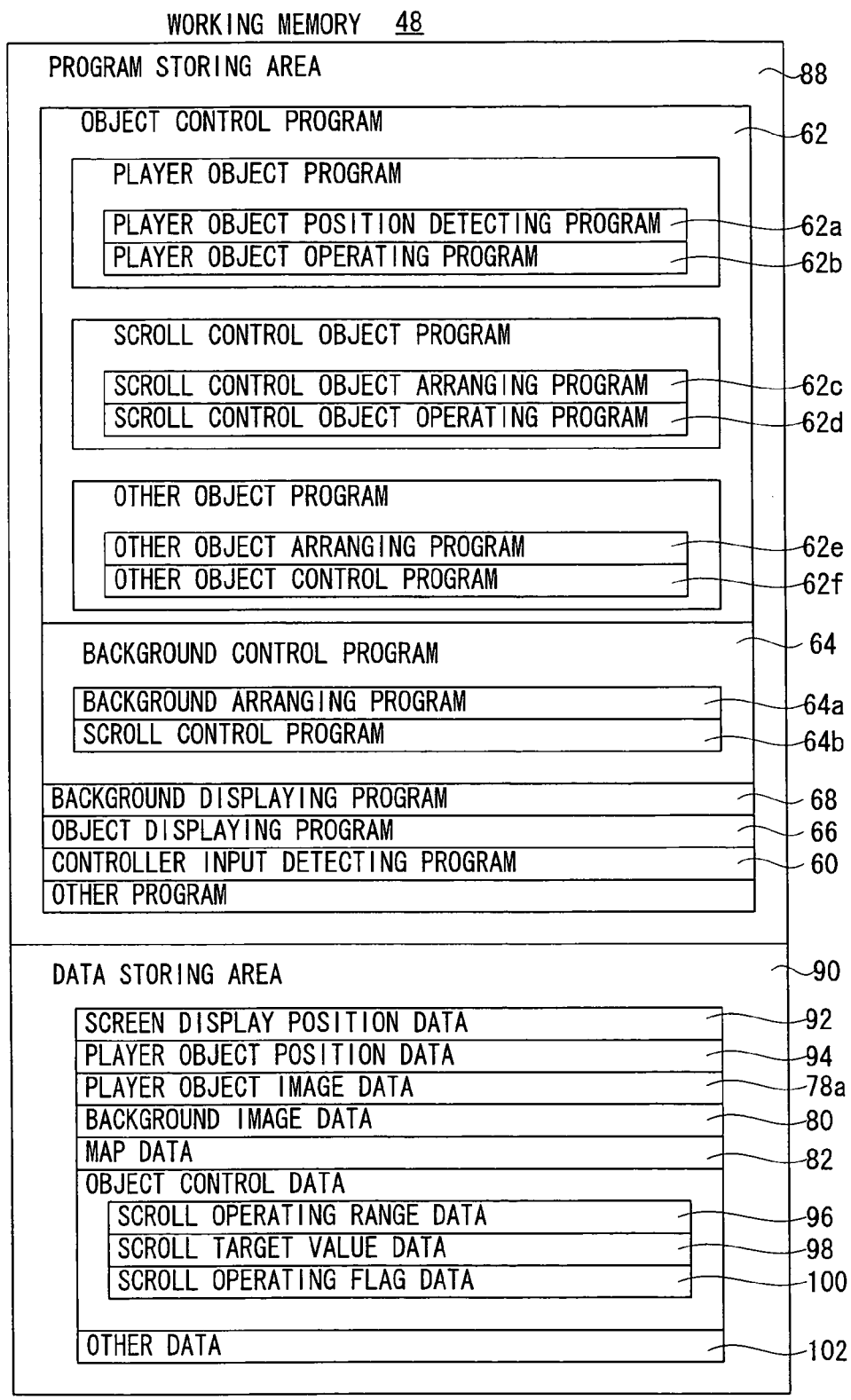
FIG. 4 is an illustrative view showing one example of a memory map of a working memory in FIG. 2.

FIG. 4 shows one example of a memory map of the working memory 48. The working memory 48 includes a program storing area 88 and a data storing area 90. In the program storing area 88, a game program read from the ROM 52 of the cartridge 14 is stored entirely at a time, or partially and sequentially. That is, in the program storing area 88, the object control program 62, the background control program 64, the background displaying program 68, the object displaying program 66, the controller input detecting program 60, and other programs (70, 72, 74, 76, and etc.) are stored. The CPU 40 executes a game process according to the game program. The object control program 62 includes programs respectively controlling the player object (moving image character operable by the player), a scroll control object, and other objects (enemy object, background object, and etc.), and specifically includes a player object position detecting program 62a, a player object operating program 62b, a scroll control object arranging program 62c, a scroll control object operating program 62d, other objects arranging program 62e, other objects control program 62f, and etc. The background control program 64 includes a background arranging program 64a, and a scroll control program 64b.

Furthermore, in the data storing area 90, game data read from the ROM 52 of the cartridge 14 and game data generated during the game are stored. That is, in the game data storing area 90, screen display position data 92, player object position data 94, player object image data 78a, background image data 80, map data 82, object control data, other data 102 are stored. The object control data includes scroll operating range data 96, scroll target value data 98, and scroll operating flag data 100. Furthermore, in the other data 102, image data of the objects except for the player object 78, sound data 84, other data 86, other game data and flag data required for progressing the game are stored.

The scroll control object is an object utilized for controlling the scroll, and generated and arranged by the scroll control object arranging program 62c in the game world. The scroll control object is arranged in a predetermined position in association with a contact object. The contact object is an object that the player object can contact, and may be displayed as a part of the background image such as a static foothold block, a land, or the like, or may be displayed as a moving object such as a moving foothold, the enemy object, or the like. The contact object to which the scroll control object is set allows the scrolling to be operated. It is noted that the scroll control object itself is transparent and invisible to the player, and is not affected by the player object.

Then, to the scroll control object, the scroll control information including the scroll operating range data 96, scroll target value data 98. is set. By the scroll control object operating program 62d, it is determined whether or not a condition for operating a scroll control is satisfied, and the scroll operating flag data 100 is set according to a state of the game. Then, by the scroll control program 64b, scrolling of the display screen is controlled, and in a case that the scroll operating flag is turned on, a screen display position is moved so as to satisfy a scroll target value.

It is noted that the player object position detecting program 62a is for detecting a position of the player object in the game world. The player object operating program 62b is for operating the player object on the basis of an operation input from the operating portion 32. The other objects arranging program 62e is for arranging other objects (enemy object, or the like) in the game world, and the other objects control program 62f is for operating the other objects.

Figure 5:
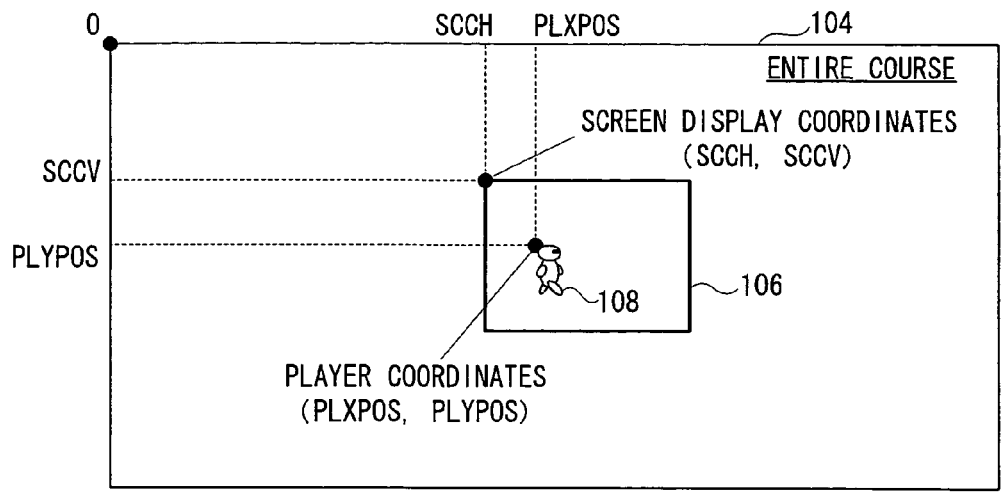
FIG. 5 is an illustrative view showing a relationship between a background image (entire course) and a screen position in FIG. 1 implementation.

Furthermore, the background arranging program 64a generates a background image 104 on the basis of the background image data 80, the map data 82, as shown in FIG. 5 for example. The map data 82 is for indicating what kind of background (land such as a foothold, wall, and so on, and movable area, and so on) is arranged in a map divided by squares for each square or unit. In a case that the game world in this non-limiting implementation includes several courses or stages, the background image 104 is equal to one entire course or stage, for example, and is larger than a display screen 106 to be displayed on the LCD 16.

In addition, the background displaying program 68 and the object displaying program 66 are for respectively generating displayed data of the display screen 106 including the background image 104 and the object image to display the same on the display 16. The controller input detecting program 60 is for detecting and obtaining an operation input signal generated in the operating portion 32 according to the operation by the player.

The screen display position data 92 includes position coordinates data of the display screen (game screen) 106 in the background image 104 as shown in FIG. 5. The screen display position is indicated by an X-coordinate SCCH and a Y-coordinate SCCV rendering the fixed point O (upper left corner in this non-limiting implementation) of the background image 104 the origin. Then, by rendering the screen display position (SCCH, SCCV) the reference point of the display screen 106, a display range having predetermined lengths (dots) from the reference point in an X direction (right direction in FIG. 5) and in a Y direction (downward direction in FIG. 5) is regarded as the display screen 106. The screen display position data 92 is adjusted so as to be closer to a scroll target when a scroll operating condition is satisfied, or is updated in association with movement of the player object 108 such that the player object 108 is captured within the display screen 106 in a case that the player object 108 comes near to the edge of the display screen 106, and so forth.

As shown in FIG. 5, the player object position data 94 is the position coordinates data of the player object 108 in the background image 104, and is indicated by the X-coordinate PLXPOS and the Y-coordinate PLYPOS rendering the fixed point O the origin. The player object position data 94 is calculated and updated on the basis of the operation input from the operating portion 32 obtained by the controller input detecting program 60, and the player object operating program 62b.

The scroll operating range data 96 and the scroll target value data 98 are stored for each scroll control object. The scroll operating range data 96 is for setting one of the scroll operating conditions. That is, one condition is that the player object 108 is located within the operating range determined by the scroll operating range data 96. The scroll operating range data 96 includes operating range left-side data SCRLEFT defining the X-coordinate on the left side of the operating range, and operating range right-side data SCRRIGHT defining the X-coordinate on the right side of the operating range in this non-limiting implementation. It is noted that the scroll operating range is not limited to define boundaries right to left, and may be for defining the boundaries up and down, or may be a constant area, and so on separated by the boundaries from right to left or up and down, for example.

The scroll target value data 98 is data SCRPOINT indicative of a target of movement for the screen display position of the display screen 106 by the scroll control, and the Y-coordinate can be set if scrolling up and down, and the X-coordinate can be set if scrolling right to left. Coordinates of the specific point may be set to the scroll target value.

Figure 6:
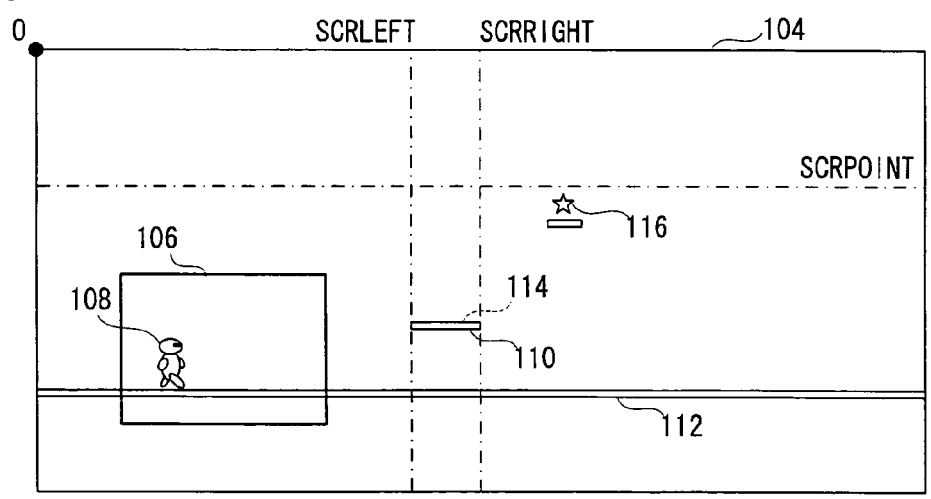
FIG. 6 is an illustrative view showing one example of a relationship among a contact object, a scroll control object, a scroll operating range, and a scroll target value.

In the game apparatus 10, as shown in FIG. 6, a contact object 110 is arranged on the background image 104. In FIG. 6, the contact object 110 is, as one example, a foothold block placed over a ground 112 in the air. The player object 108 can ride on the foothold block 110, or destroy it. Then, the scroll control object 114 with respect to the foothold block 110 is arranged at the same position as the foothold block 110 in FIG. 6 example. It is noted that the scroll control object 114 is transparent and invisible as described above, but in the interests of simplicity, a reference numeral is applied to a position of the foothold block 110 where the scroll control object 114 is also arranged. By scrolling in association with the scroll control object 114, a target object 116 to be captured within the display screen 106 is arranged. The target object 116 is expected to be provided to the player, and may be an arbitrary thing such as an item, money, an entrance to another place, and so on. The target object 116 appears within the display screen 106 when scrolling in associated with the scroll control object 114 while being arranged in a hidden position out of the display screen 106 when normally scrolling in association with a movement of the player object 108.

Furthermore, in this non-limiting exemplary implementation, the scroll operating range is set so as to become the same widths in the horizontal direction as the scroll control object 114 as shown in FIG. 6. That is, the scroll operating range left-side data SCRLEFT is set at the far left position of the scroll control object 114, and the scroll operating range right-side data SCRRIGHT is set at the far right position of the scroll control object 114. Thus, the scroll operating range may be set close to the contact object 110. Furthermore, since the screen display position is set at the upper left corner of the display screen 106, the scroll target value data SCRPOINT is set slightly above a position of the target object 116.

Figure 7:
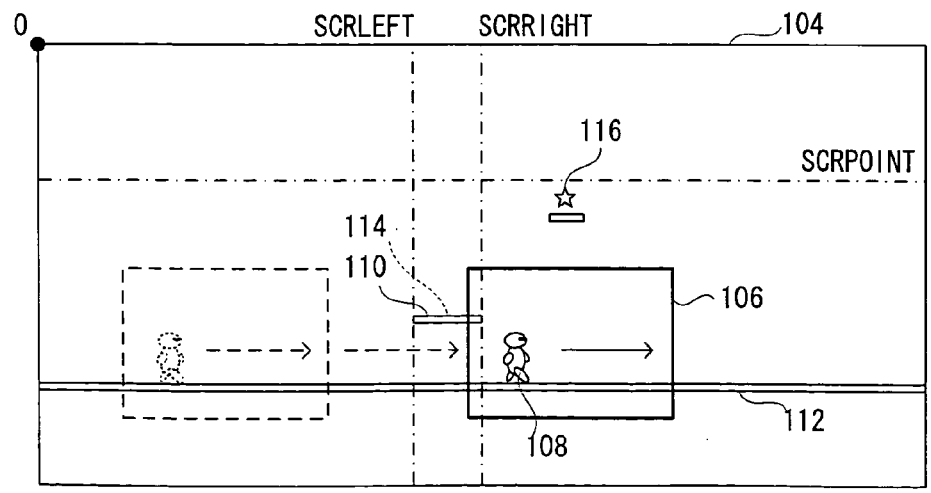
FIG. 7 is an illustrative view showing one example of a screen position in a case that the player object simply passes through a scroll operating range in FIG. 6.
Figure 8:
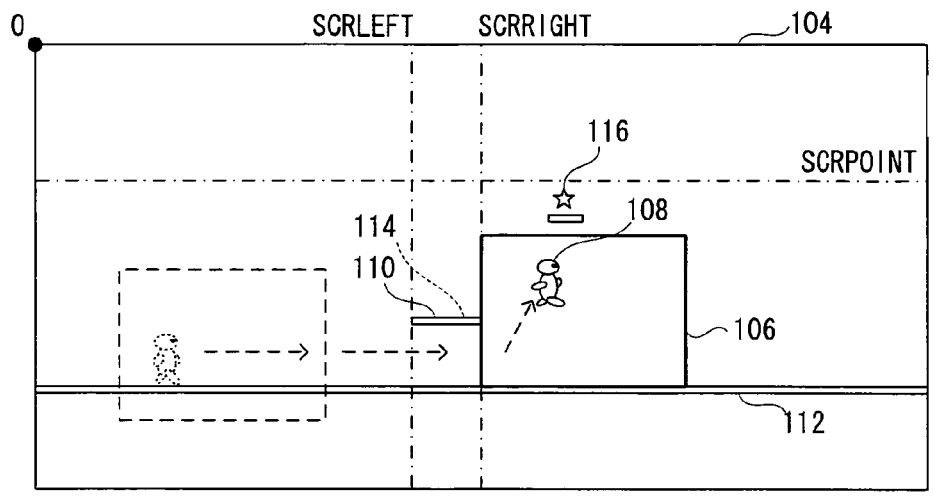
FIG. 8 is an illustrative view showing one example of the screen position in a case that the player object is closer to a target object in FIG. 6.

A condition for operating a scroll control in association with the scroll control object 114 (first scrolling) is that the player object 108 is located within the scroll operating range, and a predetermined action is performed on the contact object 110. By satisfying this condition, the screen display position is adjusted to capture the target object 116 within the display screen 106. The predetermined action as the scroll operating condition is to ride on the foothold block 110 in this example. Accordingly, in a case of simply passing through below the foothold block 110 as shown in FIG. 7, for example, the scroll operating condition is not satisfied, the scroll control is not executed, and the target object 116 does not appear within the display screen 116. Furthermore, as shown in FIG. 8, also in a case of bringing the player object 108 close into the target object 116 by jumping after passing through below the foothold block 110, a enough space is provided between the target object 116 and the player object 108, so that the target object 116 is never captured within the display screen 106.

Figure 9:
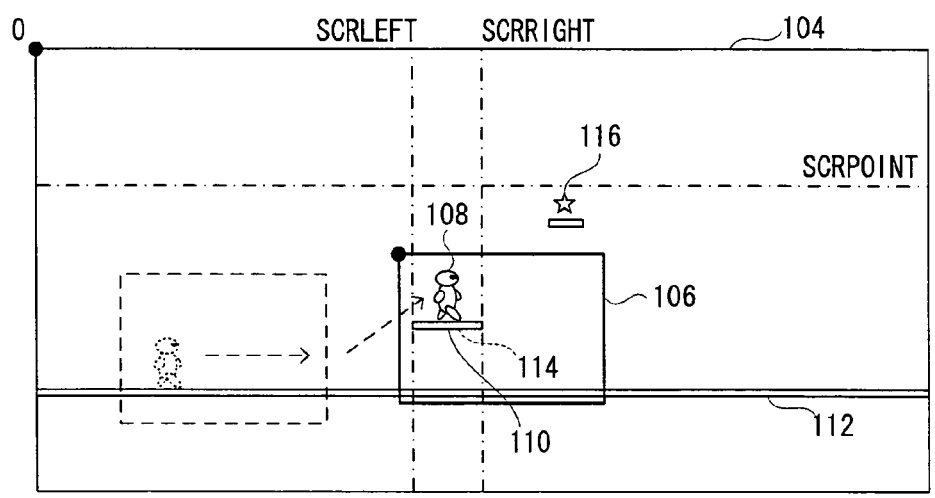
FIG. 9 is an illustrative view showing one example of a state where the player object enters the scroll operating range, and performs a predetermined action on the contact object in FIG. 6.
Figure 10:
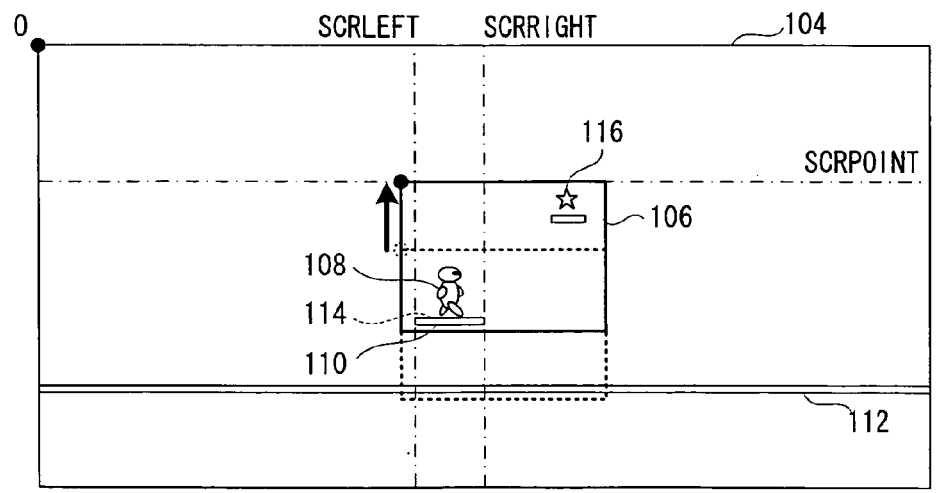
FIG. 10 is an illustrative view showing one example of a state where the screen position is scrolled to the scroll target value as a follow-up to FIG. 9.

As shown in FIG. 9, in a case that the player object 108 performs the predetermined action on the foothold block 110, that is, if riding on it in this example, the scroll operating condition is satisfied. It is noted that riding on the foothold block 110 by the player object 108 causes the position coordinates of the player object 108 to exist within the scroll operating range (SCRLEFT<PLXPOS<SCRRIGHT). Therefore, by execution of the first scroll control, the screen display position of the display screen 106 is gradually moved closer to the scroll target value SCRPOINT as shown in FIG. 10. Then, if the scroll operating condition continues to be satisfied, the screen display position reaches the scroll target value, and such the game image is displayed on the display 16. Accordingly, the target object 116 is captured within the display screen 106, and this enables the player to know the presence of the target object 116. Then, the player can go to that place if necessary, and obtain it if the target object 116 is an item to be captured.

Since the scroll operating range is set so as to be in close to the contact object 110 by the scroll control object 114, the player object 108 directly performs a predetermined action on the contact object 110 nearby, capable of performing a natural scrolling according to the action of the player object 108. Furthermore, merely riding on the foothold block 110 displayed in a static state as a part of the background image makes it relatively easy for the player to perform the first scrolling.

Figure 11:
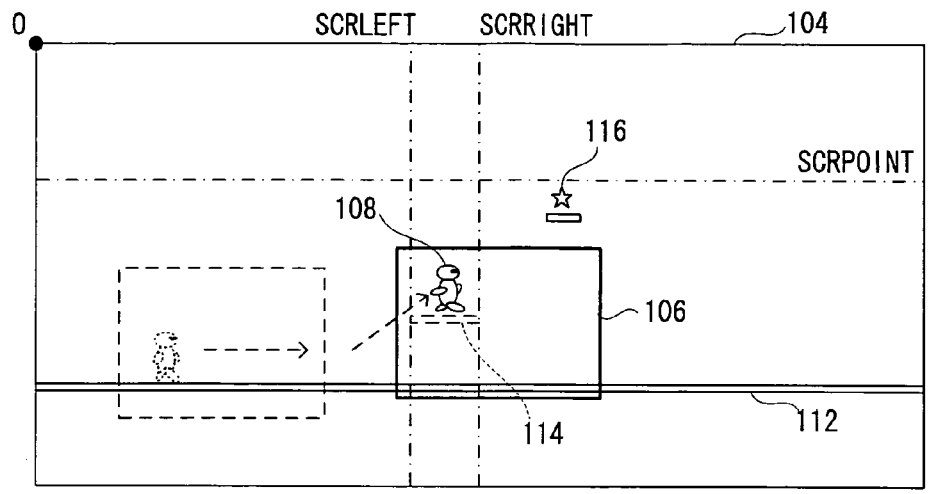
FIG. 11 is an illustrative view showing one example of the screen position in a case that the player object enters the scroll operating range after disappearance of the contact object in FIG. 6.

On the other hand, the contact object 110 of this example is the foothold block possible to be destroyed. That is, the player object 108 can destroy it by hitting the foothold block 110 from below, for example. As shown in FIG. 11, after the foothold block 110 is destroyed and disappears, the player object 108 can exist within the scroll operating range, but cannot naturally perform the predetermined action on the foothold block 110. It is noted that the scroll control object 114 is arranged at the same place as the foothold block 110, but is not affected by the player object 108, and remains at that place without disappearing. FIG. 11 shows the hidden scroll control object 114 by dashed lines. Also, the player object 108 cannot reach the position of the target object 116 due to a change of a state of the background. Accordingly, as shown in FIG. 11, after the foothold block disappears, even if the player object 108 moves again to the position where the player object 108 can ride on the foothold block 110 before its disappearance, the scroll operating condition cannot be satisfied, and therefore, the first scrolling operation is not performed. In this case, a normal screen position adjustment (second scrolling) in association with the moving position of the player object 108 is executed. That is, the screen display position is not adjusted to the scroll target SCRPOINT. Accordingly, the target object 116 which has already become impossible to be obtained, reached due to the change of the state is not scroll-displayed each time, and shake of the screen due to the troublesome scroll never occurs.

Thus, it is possible to scroll according to the state of the game. Accordingly, it is possible to perform appropriate and natural representation of the image, capable of displaying a screen that is easy for the player to play.

It is appropriate that the scroll operating range may be a definite area divided by the boundaries from right to left, and up and down, for example, and a determination of presence of the player object 108 within the scroll operating range is performed by determining whether or not the player object 108 contacts the unit where the scroll control object 114 is placed, for example.

Figure 12:
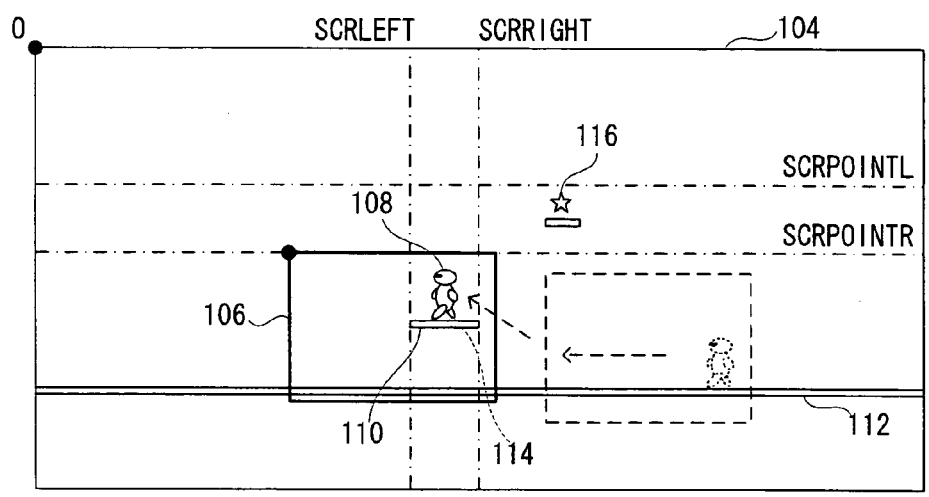
FIG. 12 is an illustrative view showing one example of the screen position to be scrolled in a case the player object enters the scroll operating range from the right in FIG. 6.

In addition, a different target value can be set to the scroll target value SCRPOINIT depending upon how to contact the scroll control object 114. In this non-limiting exemplary implementation, a different scroll target value is set depending on an approach direction to the scroll operating range. That is, the scroll target value left-side data SCRPOINTL obtained when entering the scroll operating rage from the left and the scroll target value right-side data SCRPOINTR obtained when entering the scroll operating range from the right are stored, and either of them is set to be the scroll target value SCRPOINIT depending on the approach direction. For example, in a case that the player object 108 enters the scroll operating range from the right, the scroll target value right-side data SCRPOINTR is set to the scroll target value SCRPOINIT as shown in FIG. 12, and the screen display position of the display screen 106 is adjusted such that the value of the SCRPOINTR is satisfied. In FIG. 12, the scroll target value left-side data is set to a value such that the target object 116 arranged upper right of the scroll operating range is displayed, but the scroll target value right-side data is set to a value such that the target object 116 is not displayed. Thus, the scroll control can be performed such that the target object 116 is displayed only when entering the scroll operating range from an appropriate predetermined direction (left in FIG. 12). Consequently, by changing the scroll target depending on the approach direction to the scroll operating range, varied screen displays can be performed, improving interest as a game.

Figure 13:
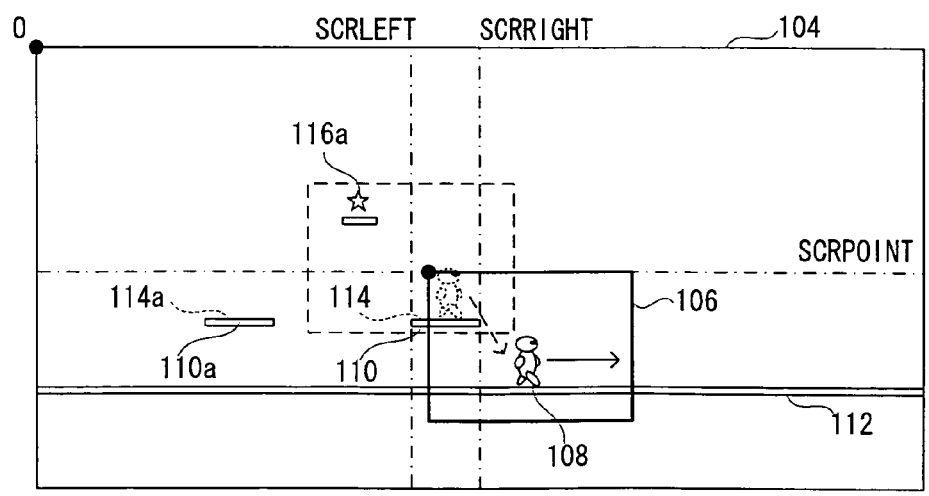
FIG. 13 is an illustrative view showing one example of the screen position to be scrolled in a case the scroll target value is set to a slightly low position.

Furthermore, the scroll target value is not necessarily set to a value such that the target object 116 is displayed, and is arbitrarily and precisely settable. In FIG. 13, the scroll control object 114 is arranged below the target object 116a in the direction of movement (right direction), for example. The target object 116a is scroll-displayed on the basis of the scroll control object 114*a* arranged with respect to the previous contact object 110*a*. Then, with respect to the scroll control object 114, the scroll target value SCRPOINT is set to be slightly low such that the progress of the game is prompted. That is, in a case that the player object 108 rides on the contact object 110, the screen is scrolled to the display position where the player object 108 has to exist on the ground 112 after getting down the contact object 110. In such the case, it is possible to inform the player that another target object 116 is not hidden with respect to the contact object 110 (scroll control object 114), so that the game can be advanced. Thus, by appropriately setting the scroll target value also, it is possible to scroll according to the state of the game.

Still furthermore, the arrangement position of the scroll control object 114 is arbitrary, and needs not to be placed at the same place as the contact object 110. The scroll control object 114 may be placed above the arrangement position of the contact object 110 by one unit, for example. Still furthermore, it is possible that the scroll control object 114 is placed at only the right end of the foothold block 110, and the scroll is operated only when the player object 108 rides on the right end of the foothold block 110, for example. Or, it is also possible that the scroll control object 114 is placed above the foothold block 110 in the air, and the scroll is operated only when the player object 108 jumps up from the contact object 110, and contacts the arrangement position of the scroll control object 114, for example.

Figure 14:
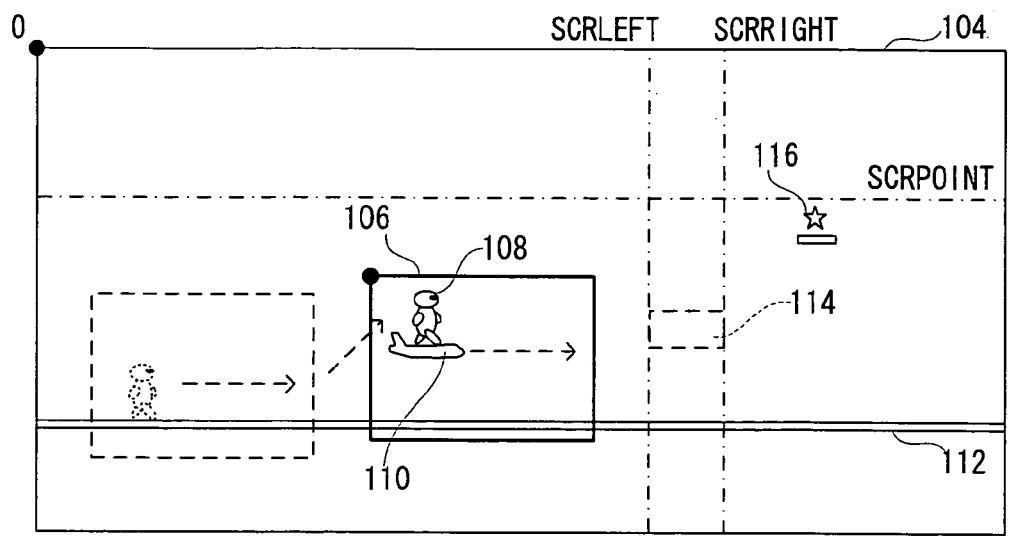
FIG. 14 is an illustrative view showing one example of the scroll control in a case that contact object is moving object, and FIG. 14 (A) shows a state where the player object rides on the contact object out of the scroll operating range, and FIG. 14 (B) shows a sate of the scroll of the display position in a case that the player object then enters the scroll operating range in accordance with movement of the contact object.
Figure 14:
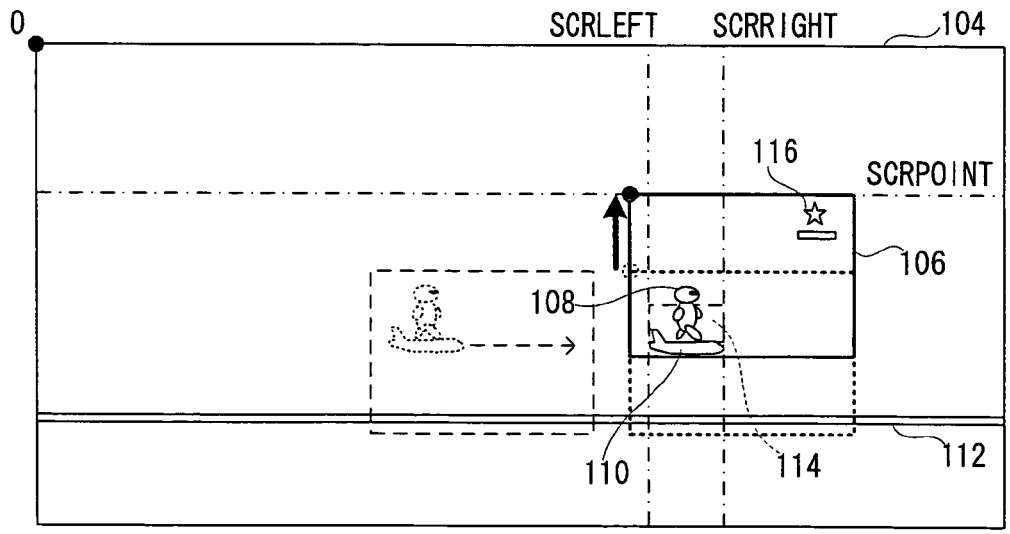

In addition, the contact object 110 to which the scroll control object 114 is set is not limited to the static background image such as the foothold block described above, and variable as necessary. The contact object 110 may be a moving object such as an enemy object, a conveyance, and so on. In FIG. 14, the contact object 110 is an airplane moving in the air as one example. A predetermined action with respect to the contact object 110 is to get on the airplane.

The scroll control object 114 with respect to the moving airplane 110 is arranged at a position where the scroll control is expected to be performed. In this example, as understood from FIG. 14 (A), the scroll control object 114 is arranged at a destination a predetermined length away from an initial position of the airplane 110 in the direction of movement (right direction). Then, the scroll operating range (SCRLEFT, SCRRIGHT) are set at position where the scroll control object 114 is arranged. Furthermore, the target object 116 is arranged at a vertical position that is normally invisible (is not displayed) in the further direction of movement, and the scroll target value SCRPOINT is set at a position slightly higher than the target object 116.

The airplane 110 moves back and forth within a constant portion including the arrangement position of the scroll control object 114, for example. Then, the player object 108 can get on the airplane 110 by jumping. When the airplane 110 moves with the player object 108 in the direction of movement, it reaches the arrangement position of the scroll control object 114 before long. At this time, the player object 108 is located within the scroll operating range, and the predetermined action of getting on the airplane 110 is performed, so that the scroll operating condition is satisfied. Accordingly, as shown in FIG. 14 (B), by executing the scroll control, the screen display position of the display screen 106 is adjusted so as to be gradually closer to the scroll target value, so that the target object 116 can be captured within the display screen 106.

Thus, if applying the moving object to the contact object 110, the player object 108 has to perform a predetermined action on the moving object, for example, in order to operate the scroll, which needs a relatively difficult operation. This makes the game challenging for the player, and improves interest.

In FIG. 14 example, the scroll control object 114 is not moved from a position initially set, but in a case that the contact object 110 is the moving object, the scroll control object 114 may be moved in association with a condition for moving the contact object 110, a moving speed. That is, it is appropriate that the scroll control object 114 is initially arranged at a position the same as the contact object 110, or a nearby position accessible by jumping, and the moving condition and moving speed of the scroll control object 114 is set to become the same as that of the contact object 110.

Figure 15:
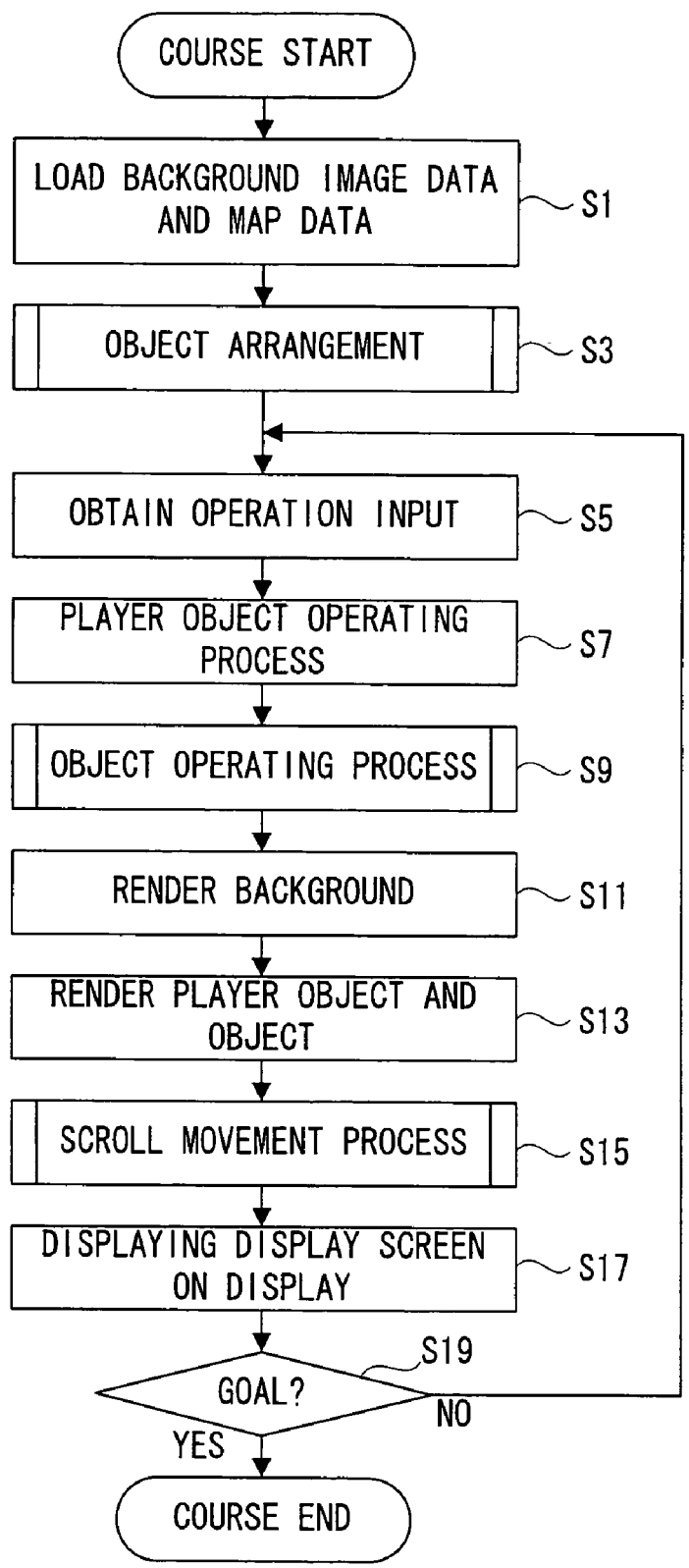
FIG. 15 is a flowchart showing one example of a game operation in FIG. 1 implementation.

In FIG. 15, one example of a game operation of the game apparatus 10 is shown. When a power source of the game machine 12 to which the cartridge 14 is attached is turned on, a necessary program and data is read from the ROM 52 of the cartridge 14 to be loaded into the working memory 48, which starts a process by the CPU 40. Then, when the game is instructed to be started by an operation input of the operating portion 32 by the player, the CPU 40 reads from the ROM 52 the background image data 80 and the map data 82 that are required for the course or the stage at that time, and loads the same into the data storing area 90 of the working memory 48 in a first step S1 in FIG. 15. This generates the background of the course, and arranges the foothold block and the ground 112.

Next, in a step S3, the CPU 40 performs an object arrangement process. By the object arrangement process, data of the player object 108 and other object such as the enemy object, and etc. are loaded, and arranged at each of the initial positions, and an initial setting of data for each object is performed. Furthermore, an arrangement process of the scroll control object 114 with respect to contact object 110 is also performed here. Exemplary detail of the setting process with respect to especially the scroll control object 114 out of the object arrangement process in the step S3 is shown in FIG. 16.

Figure 16:
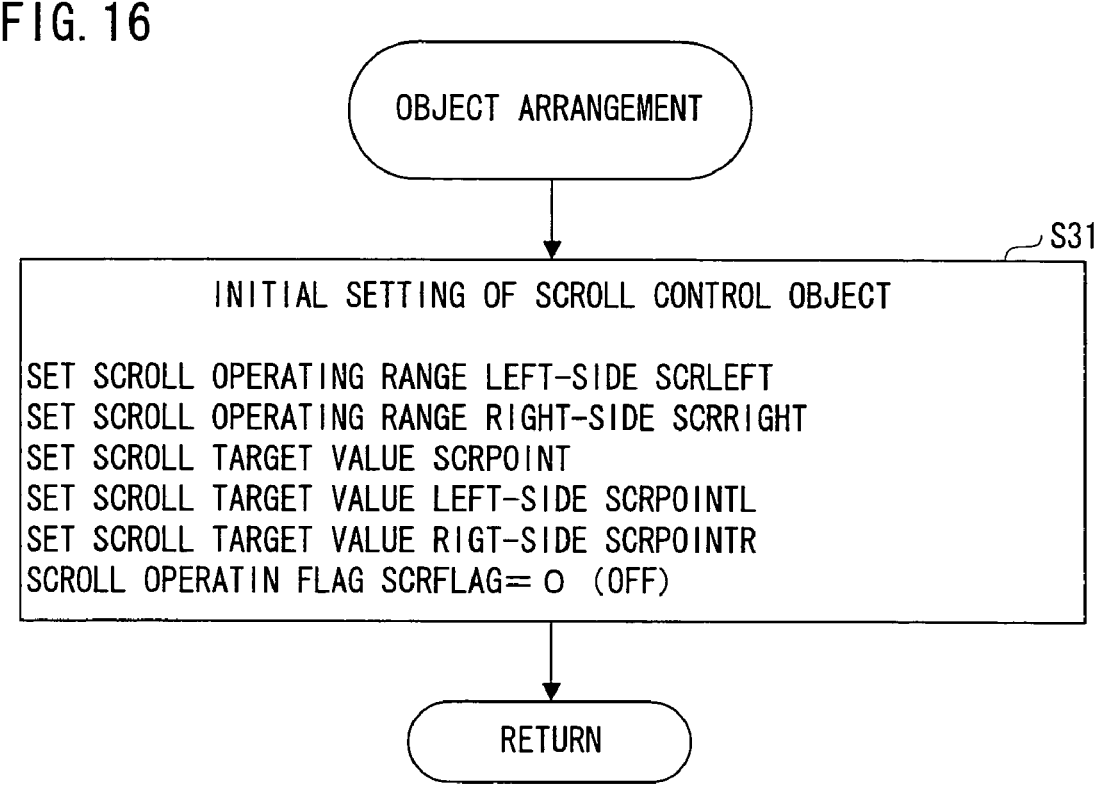
FIG. 16 is a flowchart showing one example of a loading process of object arrangement data in FIG. 15.

As shown in FIG. 16, the CPU 40 performs the initial setting of the scroll control object 114 to be arranged in this course in a step S31. More specifically, the CPU 40 reads initial setting data relating to the scroll control object 114 from the ROM 52, and loads the same in the data storing area 90. Then, an initial value is assigned to each of variables of the scroll control object 114, that is, the scroll operating range left-side data SCRLEFT, the scroll operating range right-side data SCRRIGHT, the scroll target value SCRPOINT, the scroll target value left-side data SCRPOINTL, the scroll target value right-side data SCRPOINTR, and etc. Furthermore, 0 is assigned to a scroll operating flag SCRFLAG to turn it off. It is noted that it is needless to say that in a case that a plurality of scroll control objects 114 are arranged, the initial setting is set for each scroll control object 114.

By the process in the step S3 in FIG. 15, the player object 108, the scroll control object 114, and the target object 116, and etc. are arranged in the course, and the scroll operating range and the scroll target are set.

It is noted that although not illustrated, subsequent to the step S3, as shown in FIG. 6, for example, the background image 14 including the foothold block 110, and etc. and the object such as the player object 108, and etc. are rendered on the basis of the initial setting, and the display screen 106 based on the initial screen display position is displayed on the LCD 16. Then, the player plays the game course by operating the operating portion 32 while watching the display screen 106 displayed on the LCD 16.

Returning to FIG. 15, in a succeeding step S5, the CPU 40 obtains an operation input signal from the operating portion 32. In a following step S7, the CPU 40 executes an operating process of the player object. That is, in response to the operation input signal (in a case of obtaining the operation input signal in the previous step S5) and the program, the CPU 40 operates the payer object 108. For example, when the player operates the cross button 18 of the operating portion 32, the CPU 40 moves the player object 108 to its direction in the game space, and updates the player object position data 94 to the position coordinates after movement in the step S7. Furthermore, when the A button 24 is operated, for example, the CPU 40 causes the player character 108 to jump up in the step S7.

In a following step S9, the CPU 40 performs an object operating process. In this process, the objects except for the player object 108 (enemy object, background object, scroll control object, and etc.) are operated as necessary on the basis of the operation input signal and the program. In the object operating process, a setting process of the scroll operating flag is also performed. Thus, it is determined whether or not the scroll operating condition is satisfied, and the scroll operating flag is set in correspondence to the state of the game. A scroll operating flag setting process out of the object operating process is especially shown in detail in FIG. 17.

Figure 17:
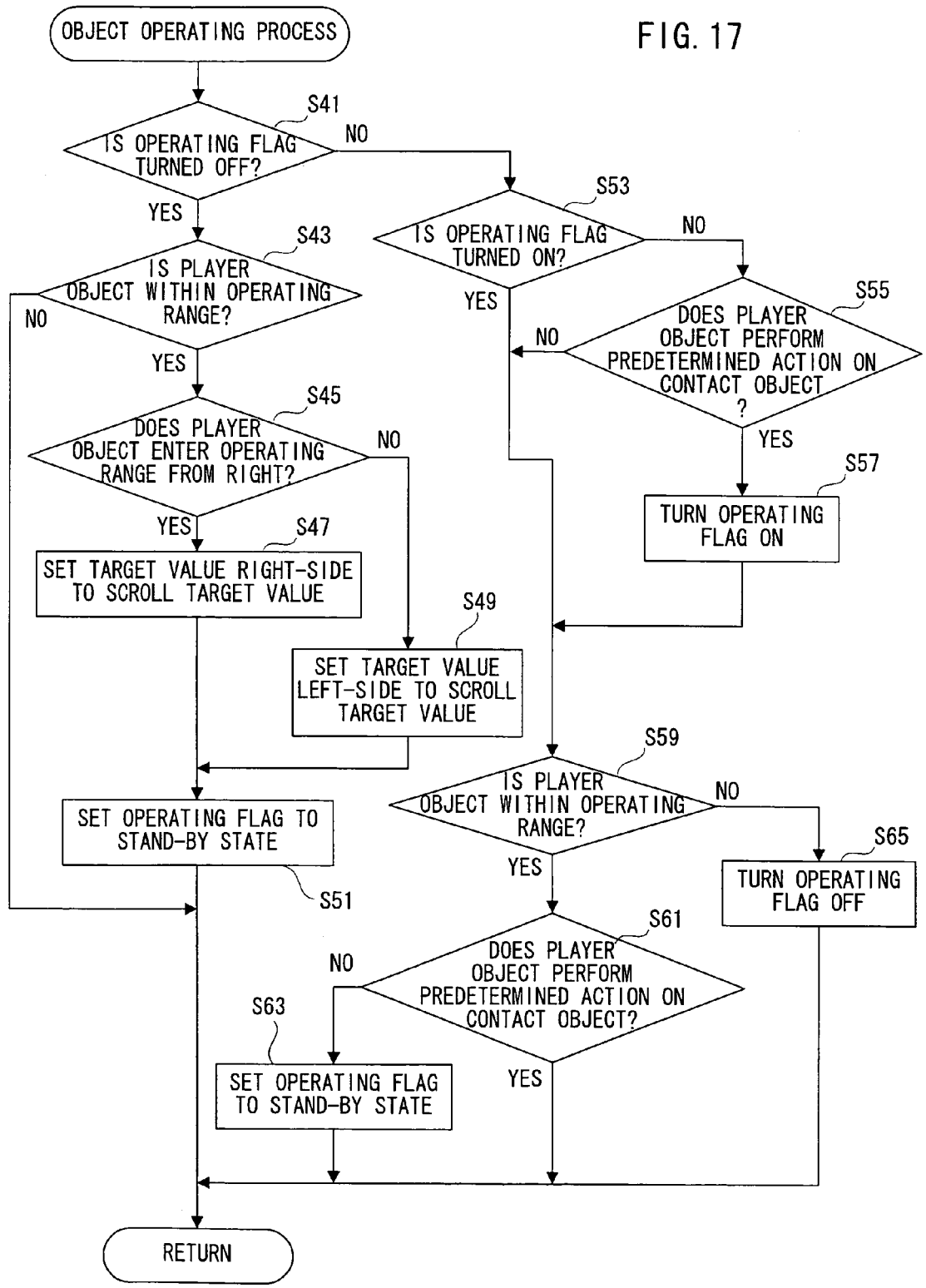
FIG. 17 is a flowchart showing one example of an object operating process in FIG. 15.

In a step S41 in FIG. 17, the CPU 40 determines whether or not scroll operating flag data 100 of the working memory 48 is turned off. If "YES" in the step S41, that is, if a condition for operating the scroll has not yet been satisfied, and the SCRFLAG is set to 0, the CPU 40 determines whether or not the player object 108 exists in a predetermined position, that is, within the scroll operating range in a following step S43. In a case that the scroll operating range left-side data SCRLEFT and the scroll operating range right-side data SCRRIGHT are set, for example, as in this exemplary non-limiting implementation, it is determined whether or not the X-coordinate PLXPOS of the player position stored in the player object position data 94 is larger than the SCRLEFT and smaller than SCRRIGHT. If "YES" in the step S43, that is, if the player object 108 enters the scroll operating range as shown in FIG. 9, for example, the process proceeds to a step S45. On the other hand, if "NO" in the step S43, that is, if the player object 108 does not exist within the scroll operating range as shown in FIG. 6, FIG. 7, FIG. 8, or the like, the process returns to the flowchart in FIG. 15.

In the step S45, the CPU 40 determines whether or not the player object 108 enters the scroll operating range from the right. In a case that the player object 108 enters the scroll operating range from the right as shown in FIG. 12, for example, the CPU 40 assigns the scroll target value right-side data SCRPOINTR to the scroll target value data SCRPOINT in a following step S47. On the other hand, if the player object 108 enters the scroll operating range from the left as shown in FIG. 9, for example, the CPU 40 assigns the scroll target value left-side data SCRPOINTL to the scroll target value data SCRPOINT in a following step S49. Thus, a different scroll target value is set depending on the approach direction to the scroll operating range.

Succeedingly, in a step S51, the CPU 40 assigns 2 to the scroll operating flag SCRFLAG to set it to a stand-by state. That is, since one of two conditions for operating the scroll control, that is, a condition that the player object 108 is located within the scroll operating range is satisfied, it is set to the stand-by state in order to discriminate it from a case that the conditions are not satisfied. After completion of the process in the step S51, the process returns to the flowchart shown in FIG. 15.

On the other hand, if "NO" in the step S41, that is, if the scroll operating flag SCFLAG is not 0, the CPU 40 determines whether or not the scroll operating flag is turned on in a following step S53.

If "NO" in the step S53, that is, the scroll operating flag SCRFLAG is set in a stand-by state, it is determined that whether or not the player object 108 performs the predetermined action on the contact object 110 in a following step S55. In a case that the contact object 110 is the foothold block as shown in FIG. 9, for example, it is determined whether or not to ride on the foothold block 110. If "YES" in the step S55, that is, if the other of two conditions for operating the scroll control is satisfied, the CPU 40 assigns 1 to the scroll operating flag SCRFLAG to turn it on in a succeeding step S57.

On the other hand, if "YES" in the step S53, that is, if the scroll operating flag SCRFLAG is 1, the process proceeds to a step S59. Furthermore, if "NO" in the step S55, that is, if the player object 108 is located within the operating range, but the predetermined action has not yet been performed, the process also proceeds to the step S59. Therefore, in a case it is detected that the contact object 110 has already disappeared as shown in FIG. 11, and so forth, even if the player object 108 enters the scroll operating range, "NO" is determined in the step S55, and therefore, scrolling to the scroll target is not performed.

The following process from steps S59 to S65 is for detecting the change of the state of the game, and then changing the setting of the scroll operating flag when the scroll operating flag is turned on or set in a stand-by state.

In the step S59, the CPU 40 determines whether or not the player object 108 is located within the scroll operating range. If "YES" in the step S59, the CPU 40 determines whether or not the player object 108 performs the predetermined action on the contact object 110 in the following step S61. If "YES" in the step S61, it is appropriate that the scroll operating flag remains to be turned on as it is, and therefore, the process directly returns to the flowchart in FIG. 15. On the other hand, if "NO" in the step S61, that is, if the state of the game is changed such that the player object does not perform the predetermined action, the CPU 40 sets the scroll operating flag to the stand-by state in the step S63, and the process returns to the flowchart in FIG. 15. On the other hand if "NO" in the step S59, that is, if the state of the game is changed such that the player object 108 moves out of the scroll operating range, the CPU 40 turns the scroll operating flag off in the following step S65, and then, the process returns to the flowchart in FIG. 15.

Returning to FIG. 15, in a succeeding step S11, the CPU 40 renders the background image on a predetermined area of the VRAM not shown on the basis of the background image data 80, the map data 82, and etc. Furthermore, in a step S13, the CPU 40 renders the images of the player object 108, another object, and etc. on the basis of the object image data 78 including the player object image data 78a, and etc on a predetermined area of the VRAM.

In a succeeding step S15, the CPU 40 executes a scroll movement process. By the scroll movement process, when the scroll operating conditions are satisfied, a scrolling different from the normal scrolling is performed. The detail of the process in the step S15 is shown in FIG. 18.

Figure 18:
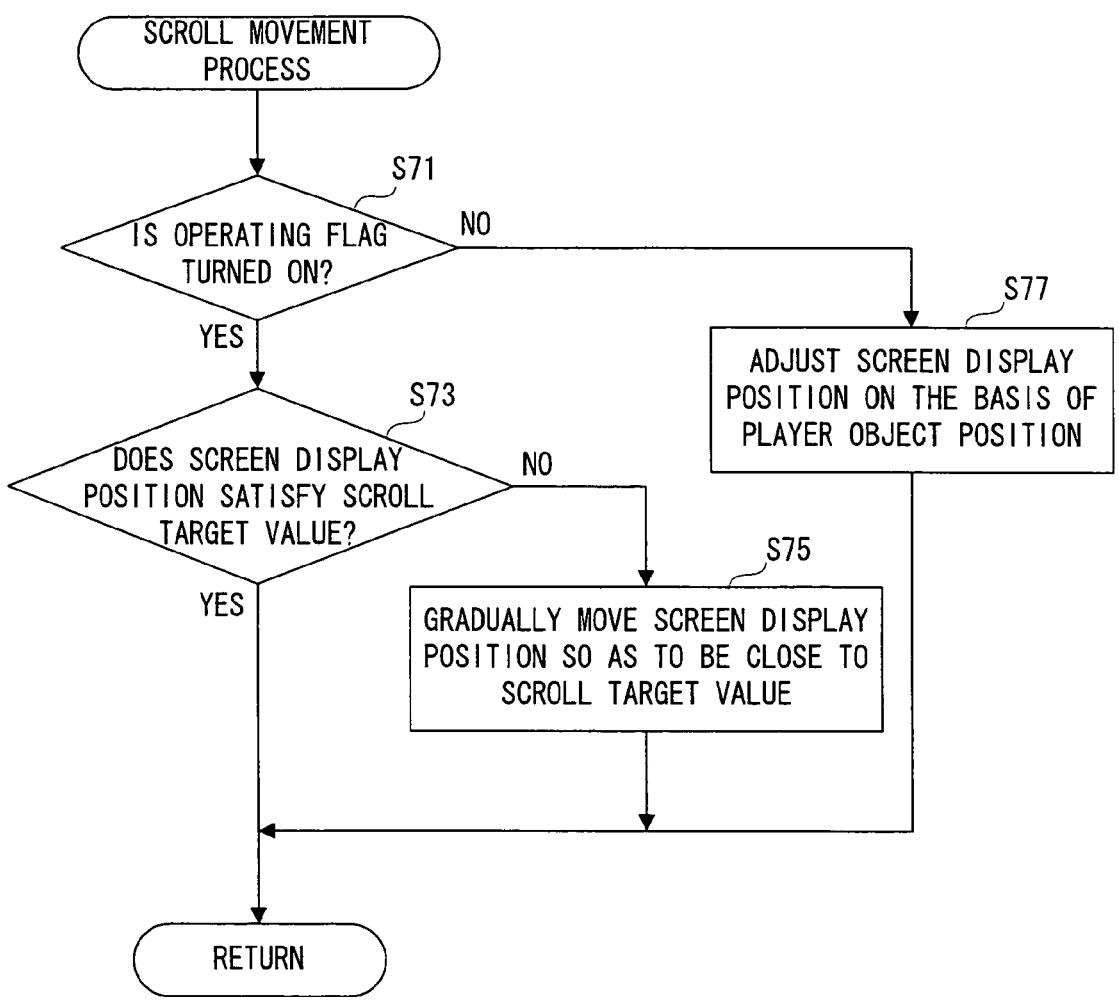
FIG. 18 is a flowchart showing one example of a scroll movement process in FIG. 15.

In a first step S71 in FIG. 18, the CPU 40 determines whether or not the scroll operating flag SCRFLAG is turned on, and if "YES", it is determined whether or not the screen display position data 92 satisfies the scroll target value data 98 in a step S73. In a case that the Y-coordinate value is set to the scroll target value SCRPOINT, for example, it is determined whether or not the Y-coordinate value SCCV of the screen display position is equal to the SCRPOINT, or, in a case that a specific point is set to the scroll target value, it is determined whether or not the screen display position becomes that target point.

If "NO" in the step S73, that is, if a scroll adjustment of the screen display position is not completed, the CPU 40 gradually moves the display screen position so as to be closer to the scroll target value in a step S75. It is appropriate that the screen display position is adjusted so as to gradually become closer to the scroll target value from the screen display position before scrolling by a predetermined ratio. By the first scrolling, the screen display position is adjusted, and as shown in FIG. 10, FIG. 12, FIG. 13, FIG. 14, or the like, the display screen 106 which is subjected to the position adjustment to the scroll target value is displayed. After completion of the process in the step S73, the process returns to the flowchart in FIG. 15.

On the one hand, if "YES" in the step S73, that is, if the scroll adjustment is completed, the process directly returns to the flowchart in FIG. 15.

On the other hand, if "NO" in the step S71, that is, if the scroll operating flag is turned off or set in a stand-by state, the CPU 40 adjusts the screen display position on the basis of the position of the player object 108 in a step S77 as necessary. By the second scrolling, the display screen 106, in a case that the player object 108 is closer to the edge of the display screen 106, is moved in association with its movement if necessary. After completion of the process in the step S77, the process returns to the flowchart in FIG. 15.

Returning to FIG. 15, in a succeeding step S17, the CPU 40 causes the display 16 to display the display screen 106. More specifically, the CPU 40 combines various object images such as the background image 104, the player object 108, and etc. generates image data within the display range, that is, the image data of the display screen 106 in a frame area of the SCR-VRAM not shown, for example, on the basis of the screen display position data 92, and applies the image data (displayed data) to the LCD 16 to display the display screen 106 on the LCD 16 by use of an LCD controller not shown.

Then, in a step S19, the CPU 40 determines whether or not the player object 108 reaches a goal of the course, and if "YES", the game processing of the course is completed. On the other hand, if "NO" in the step S19, the process returns to the step S5 so as to repeat the game processing of the course.

Accordingly, in a case that the scroll operating condition is satisfied, the process from the steps S5 to S19 is repeated for each frame or a predetermined number of frames, and whereby as shown in FIG. 10, FIG. 12, FIG. 13, FIG. 14, or the like, the display screen 106 whose screen display position is moved to the scroll target value is displayed on the LCD 16.

According to this exemplary non-limiting implementation, a scrolling (first scrolling) when the player object 108 is located within the scroll operating range and performs the predetermined action on the contact object 110, and a normal scrolling (second scrolling) when the predetermined action is not performed on the contact object 110 are differentiated. Thus, after the contact object 110 disappears to change a state of the background, for example, even if the player object 108 moves once again to the position where the scrolling is operated before the change, the player object 108 cannot perform the predetermined action on the contact object 110, and therefore, the first scrolling is never operated. This can eliminate a useless and unnatural screen display such as displaying an item that becomes impossible to be obtained, and so forth, capable of preventing a shake of the screen and drudgery thereof, and etc. Therefore, it is possible to scroll according to a state of the game. Furthermore, appropriate and natural image representation can be performed in association with the movement of the player object 108, capable of displaying a screen that is easy for the player to play.

In addition, the scroll control information such as the scroll target value data, the scroll operating range data, and etc. is prepared in association with the scroll control object 114 aside from the contact object 110, and the scroll control object is arranged with respect to the contact object 110 only required for the scroll control, capable of providing a less data volume than in giving the scroll control information to all the contact objects 110. Furthermore, it is possible to easily perform a precise setting and change the control method for each contact object 110.

It is noted that although the kind of the contact object 110 to which the scroll control object 114 is set is not variable during the game but constant in the above-described exemplary non-limiting implementation, as shown in modified examples described with reference to FIG. 19, FIG. 20, and FIG. 21, in a case that the contact object 110 to which the scroll control object 114 is set is variable kinds in correspondence to the state of the game, the scroll control depending on the kind may be performed.

Figure 19:
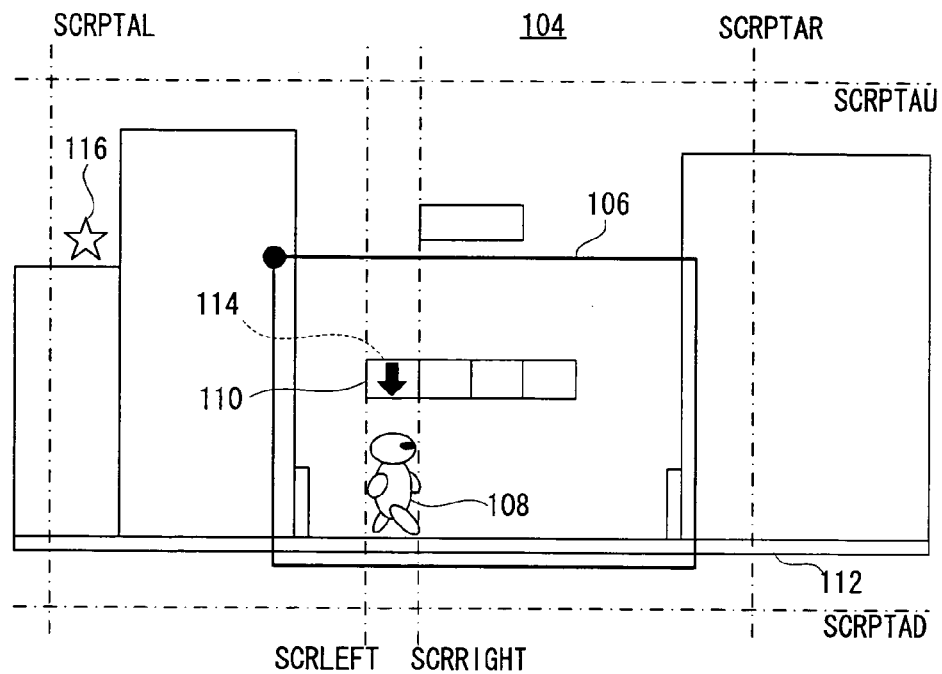
FIG. 19 is an illustrative view showing one example of a scroll target value set for each kind in a modified example in correspondence to the contact object of variable kinds.

That is, in the modified example, as shown in FIG. 19, the foothold block 110 having, on its surface, an arrow to be changed in correspondence with the state of the game is arranged as the contact object 110 of variable kinds on the background image 104. The direction of the arrow may be rotated with the course of time like a clock, may be changed each time the player object comes to that place, or may be different depending on a state of the player object 108 (amount of money, possessed item, and etc.).

The scroll control object 114 is arranged with respect to such the contact object 110. In the modified example, the scroll control object 114 is arranged at the same place as the contact object 110, and the scroll operating range data SCRLEFT and SCRRIGHT are set at the arrangement position of the scroll control object 114 in correspondence with the width thereof, for example. The scroll target value having a scroll direction and a scroll amount depending on the kind of the contact object 110 (direction of the arrow in this example) is set to the scroll control object 114. More specifically, the scroll target value SCRPTAD for scrolling down at a time of a down arrow, the scroll target value SCRPTAU for scrolling up at a time of a up arrow, the scroll target value SCRPTAL for scrolling to the left at a time of a left arrow, the scroll target value SCRPTAR for scrolling to the right at a time of a right arrow are respectively set. It is noted that the initial setting relating to the scroll target value, the scroll operating range, and etc. is performed in the object arrangement process in the step S3 in FIG. 15 as in the above-described exemplary non-limiting implementation.

Then, when the scroll operating condition is satisfied, the scroll target value depending on the kind of the contact object 110 at that time is adopted. It is noted that the predetermined condition with respect to this contact object 110 is to ride on it, for example. In FIG. 19 example, the target object 116 is arranged at a position that newly becomes the display range when the scroll target value SCRPTAL at a time of the left arrow is adopted. That is, in this example, only when the player object 108 rides on the foothold block 110 on which the left arrow is displayed, the screen in a state that the target object 116 is within the display screen 106 is presented to the player, and except that, the target object 116 is not captured within the display range.

Figure 20:
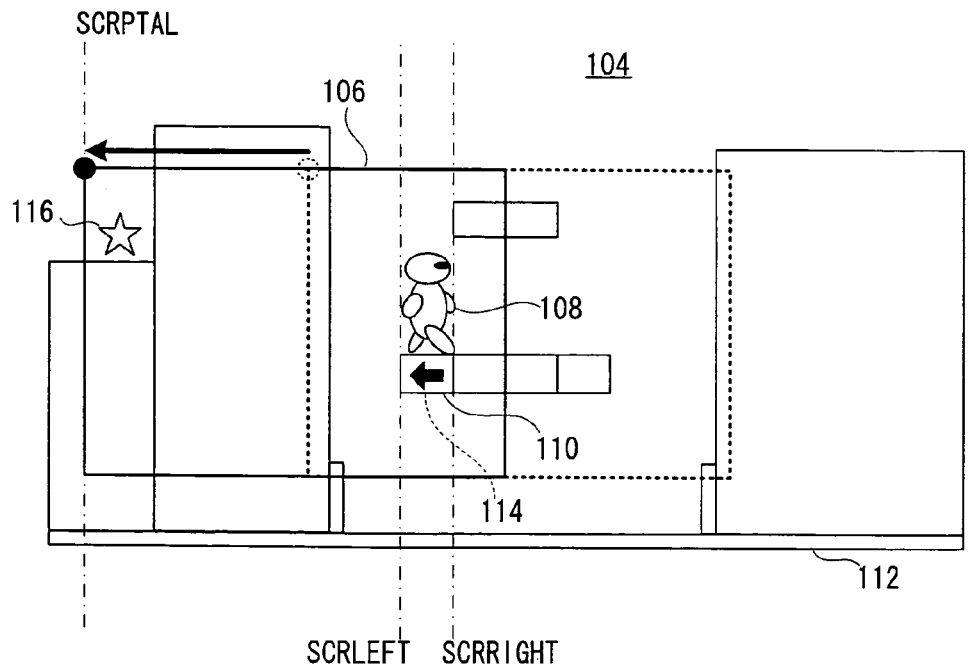
FIG. 20 is an illustrative view showing a state where the screen position is scrolled depending on the kind of the contact object when the scroll operating condition is satisfied in FIG. 19 modified example.

As shown in FIG. 20, the player object 108 moves within the scroll operating range and rides on the contact object 110, so that the scroll operating condition is satisfied, which executes the scroll control. Then, the direction of the arrow of the scroll control object 114 when the scroll operating condition is satisfied is left in FIG. 20 example. Accordingly, the scroll target value SCRPTAL at a time of the left arrow is set to the scroll target value SCRPOINT. Then, the screen display position is moved so as to be gradually closer to the scroll target value SCRPTAL, so that the target object 116 is displayed within the display screen 106.

Figure 21:
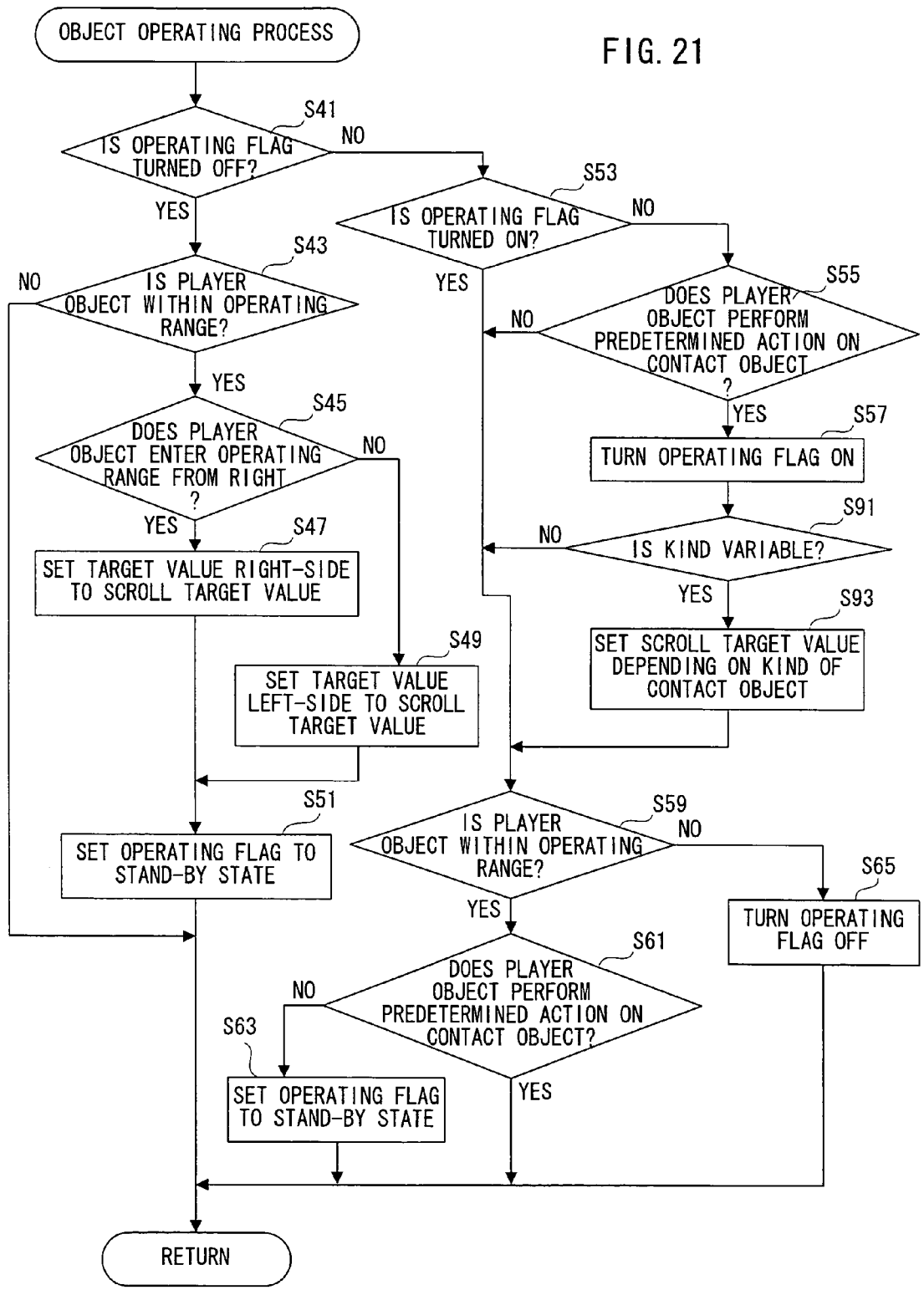
FIG. 21 is a flowchart showing one example of the object operating process in FIG. 19 modified example.

In FIG. 21, one example of an object operating process in the case of the modified example is shown. The object operating process in FIG. 21 is the same as the object operating process of the above-described exemplary non-limiting implementation shown in FIG. 17 except that the process in steps S91 and S93 is added subsequent to the step S57. Accordingly, the same reference numeral is applied to the same process in order to omit the description.

If "YES" in the step S55, that is, if the player object 108 is located within the scroll operating range, and performs the predetermined action on the contact object 110, the CPU 40 turns the scroll operating flag on in the step S57, and it is determined whether or not the kind of the contact object 110 is variable in the succeeding step S91.

If "NO" in the step S91, that is, if the contact object 110 is not variable kinds such as the foothold in FIG. 6 example, the airplane in FIG. 14, and etc., the process directly proceeds to the step S59.

On the other hand, if "YES" in the step S91, that is, if the contact object 110 is variable kinds such as the foothold block having a variable display arrow in FIG. 9 example, the CPU 40 sets the scroll target value SCRPOINT depending on the kind of the contact object 110 in the succeeding step S93. For example, as shown in FIG. 20, when the contact object 110 at that time is the foothold block on which left arrow is displayed, the scroll target value SCRPTAL at a time of the left arrow is assigned to the scroll target value SCRPOINT. After the completion of the process in the step S93, the process proceeds to the step S59.

Accordingly, in a case that the scroll operating condition is satisfied at a time of the left arrow as shown in FIG. 20, by the subsequent scroll movement process in the step S15 in FIG. 15, the screen display position is brought closer to the scroll target value, and by the following step S17, the display screen 106 on which the adjustment of the screen position is performed is displayed on the LCD 16. Therefore, the target object 116 is soon displayed within the display screen 106.

According to the modified example, it is possible to respond to the contact object 110 of variable kinds, so that scrolling in correspondence with the state of the game is performed. Furthermore, it is possible to perform varied screen displays depending on the kind of the contact object 110 and to perform a plurality of screen position adjustments in the same scene, thereby adding flexibility and interest.

In addition, although the predetermined action with respect to the contact object 110 is to ride on it as one example in the above-described exemplary non-limiting implementation, the predetermined action may arbitrarily be set. For example, the predetermined action may be to simply contact the contact object 110, to hit it from below in a case that the contact object 110 is not destroyed, to crash into the contact object 110, and to jump up on the contact object 110. In a case that the predetermined action is an instant action such as hitting, crashing, and so forth, and not a successive action such as riding, the condition of the predetermined action is instantly satisfied, the adjustment of the screen position becomes instant, and is never completed to the scroll target value in most cases. Accordingly, it is appropriate that in place of the process in step S61 in FIG. 17 or FIG. 21, by determining whether or not the scrolling to the scroll target value is completed, and remaining to be turn the scroll operating flag on until the scrolling is completed, the adjustment to the scroll target value is appropriately performed.

In addition, although by arranging the scroll control object 114 on the contact object 110 required to be scrolled, scrolling is operated in the above-described exemplary non-limiting implementation, the scroll control object 114 is not necessarily utilized. Depending on the case, if the contact object 110 is moving object, for example, the contact object 110 itself may have the scroll control information. It is possible that the kind of the contact object for operating scrolling can be limited, and common scroll control information is applied to only the limited kind of the contact object to provide constant scrolling.

Although the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

What is claimed is:

1. A game apparatus that generates a background image larger than a display screen for display on the display screen by scrolling, comprising:
   an input device operated by a player;
   a background image generator which generates a displayed background image based on the background image;
   a player object generator which generates a player object movable on the basis of an input to the input device;
   a contact object generator which generates a contact object to be contacted by the player object;
   a scroll object generator which generates a scroll control object associated with the contact object and arranged in a manner that the scroll control object is not seen by the player;
   at least one scroll control object information storage area which stores scroll control information associated with the scroll control object;
   a position detector which detects a position of the player object;
   an existence determiner which determines whether or not the contact object associated with the scroll control object exists;
   a first scroller which generates a first scroll, when it is detected by the position detector that the player object exists at a predetermined position with respect to the scroll control object and it is determined by said existence determiner that the contact object associated with the scroll control object exists, wherein the first scroll is operable to scroll the display screen to a scroll target determinable based at least in part on the scroll control information at a predetermined position on the background image and does not generate the first scroll when it is not detected by the position detector that the player object exists at the predetermined position with respect to the scroll control object or when it is not determined by said existence determiner that the contact object associated with the scroll control object exists; and
   a display data generator which generates display data for the display screen including the player object that is generated by the player object generator and exists within a display range scrolled by the first scroller and the displayed background image generated by the background image generator, wherein the display range includes a target exposed to view when said first scroll occurs.

2. A game apparatus according to claim 1, wherein said contact object generator generates said contact object as a part of said background image.

3. A game apparatus according to claim 1, wherein said contact object generator generates said contact object as a moving object.

4. A game apparatus according to claim 1, wherein said scrolling arrangement changes, when said position detector detects that said player object is disposed at said predetermined position, a scroll target in said first scrolling operation depending on an approach direction of said player object to said predetermined position.

5. A game apparatus according to claim 1, further comprising:
a predetermined action determiner which determines whether or not the player object performs a predetermined action on the contact object on which the scroll control object is arranged; and
a second scroller which generates a second scroll different from the first scroll, in response to the predetermined action determined by said predetermined action determiner, when it is not detected by the position detector that the player object exists at a predetermined position with respect to the scroll control object or when it is not determined by said existence determiner that the contact object associated with the scroll control object exists.

6. A game apparatus according to claim 5, wherein
said scrolling arrangement differentiates between the first scrolling operation when the action determiner determines that the predetermined action is performed, and the second scrolling operation when the action determiner determines that the predetermined action is not performed by said predetermined action determiner when the position detector detects that said player object exists at a predetermined position close to said contact object.

7. A game apparatus according to claim 5, wherein
said contact object generator generates different kinds of contact objects, and said scrolling arrangement changes a scroll target in said first scrolling operation depending on a kind of said contact object when said action determiner determines that the predetermined action is performed.

8. A game apparatus according to claim 5, wherein the contact object disappears when the player object performs the predetermined action on the contact object.

9. A game apparatus according to claim 1, wherein the contact object is generated as a portion of said displayed background image.

10. A non transitory computer-readable storage medium storing a game program for execution by a game apparatus comprising a player input device, a display, and a graphics generator that generates a scrolling background image larger than the display, said game program controlling a processor of said game apparatus to perform:
generating a displayed background image based on the background image;
generating a player object movable on the basis of an input to the input device;
generating a contact object to be contacted by the player object;
generating a scroll control object associated with the contact object and arranged in a manner that the scroll control object is not seen by the player;
storing scroll control information associated with the scroll control object;
detecting a position of the player object;
determining whether or not the contact object associated with the scroll control object exists;
generating a first scroll, when it is detected that the player object exists at a predetermined position with respect to the scroll control object and it is determined that the contact object associated with the scroll control object exists, wherein the first scroll includes scrolling the display screen to a scroll target determinable based at least in part on the scroll control information at a predetermined position on the background image and does not generate the first scroll when it is not detected by the position detector that the player object exists at the predetermined position with respect to the scroll control object or when it is not determined that the contact object associated with the scroll control object exists; and
generating display data for the display including the player object that exists within a scrolled display range and the generated displayed background image, wherein the display range includes a target exposed to view when said first scroll occurs.

11. A storage medium storing a game program according to claim 10, wherein said contact object generating generates said contact object as a part of said background image.

12. A storage medium storing a game program according to claim 10, wherein said contact object generating generates said contact object as a moving object.

13. A storage medium storing a game program according to claim 10, further including changing, in a case that it is detected that said player object exists at said predetermined position, by a scroll target in said first scrolling operation depending on an approach direction of said player object to said predetermined position.

14. A storage medium storing a game program according to claim 10, wherein said contact object generating generates different kinds of contact objects of, and further including changing a scroll target in said first scrolling operation depending on a kind of said contact object when a predetermined action is performed.

15. A storage medium storing a game program according to claim 10, further comprising:
determining whether or not the player object performs a predetermined action on the contact object on which the scroll control object is arranged; and
generating a second scroll different from the first scroll, in response to whether it is determined that the player object performs a predetermined action on the contact object, when it is not detected that the player object exists at a predetermined position with respect to the scroll control object or when it is not determined that the contact object associated with the scroll control object exists.

16. A storage medium storing a game program according to claim 15, wherein
said differentiating differentiates between the first scrolling operation when the predetermined action is performed and the second scrolling operation when the predetermined action is not performed when said player object exists at a predetermined position close to said contact object.

17. A storage medium storing a game program according to claim 15, wherein the contact object disappears when the player object performs the predetermined action on the contact object.

18. A storage medium storing a game program according to claim 10, wherein the contact object is generated as a portion of said displayed background image.

* * * * *